(12) United States Patent
Wang et al.

(10) Patent No.: US 7,557,464 B2
(45) Date of Patent: Jul. 7, 2009

(54) SYSTEM AND METHOD FOR ISOLATING SOURCES AND LOADS OF A POWER SYSTEM

(75) Inventors: Kon-King M. Wang, Canton, MI (US); Kent M. Harmon, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 294 days.

(21) Appl. No.: 11/440,419

(22) Filed: May 23, 2006

(65) Prior Publication Data

US 2007/0274113 A1    Nov. 29, 2007

(51) Int. Cl.
*H02J 7/00* (2006.01)
(52) U.S. Cl. ....................................... 307/65
(58) Field of Classification Search .................. 307/65
See application file for complete search history.

(56) References Cited

U.S. PATENT DOCUMENTS

| 5,612,580 | A | 3/1997 | Janonis et al. ............. 307/64 |
|---|---|---|---|
| 5,633,539 | A | 5/1997 | Tassitino, Jr. ............. 307/64 |
| 5,684,686 | A | 11/1997 | Reddy ........................ 363/97 |
| 6,021,052 | A | 2/2000 | Unger et al. ................ 363/26 |
| 6,219,623 | B1 | 4/2001 | Wills .......................... 702/60 |
| 6,239,582 | B1 | 5/2001 | Buzan et al. ................ 322/20 |
| 6,295,215 | B1 | 9/2001 | Faria et al. .................. 363/37 |
| 6,307,757 | B1 | 10/2001 | Porter et al. ............. 363/21.01 |
| 6,452,289 | B1 | 9/2002 | Lansberry et al. .......... 307/25 |

(Continued)

FOREIGN PATENT DOCUMENTS

JP    2002-152976    5/2002

OTHER PUBLICATIONS

Georgakis, D., et al., "Operation of a prototype Microgrid system based on micro-sources equipped with fast-acting power electronics interfaces," in Proceedings of the 35th Annual IEEE Power Electronics Specialists Conference, Aachen, Germany, 2004, pp. 2521-2526.
Macken, K., et al., "Mitigation of Voltage Dips Through Distributed Generation Systems," IEEE Transactions on Industry Applications, Nov./Dec. 2004, vol. 40, No. 6., pp. 1686-1693.
U.S. Appl. No. 11/440,212, filed May 23, 2006, Wang et al.
U.S. Appl. No. 11/440,216, filed May 23, 2006, Wang et al.
U.S. Appl. No. 11/440,219, filed May 23, 2006, Wang et al.
U.S. Appl. No. 11/440,229, filed May 23, 2006, Wang et al.

*Primary Examiner*—Robert L. Deberadinis

(57) ABSTRACT

A system and method for isolating sources and loads of a power system are disclosed. Briefly described, one embodiment includes at least a DC bus operable at a DC bus voltage; a non-isolated first primary converter module electrically coupled to the DC bus and operable to receive a first amount of power from a first power source, and operable to convert the received power from the first power source into a first amount of DC power at the DC bus voltage; and an isolated second primary converter module electrically coupled to the DC bus and operable to receive a second amount of power from a second power source, and operable to convert the received power from the second power source into a second amount of DC power at the DC bus voltage, wherein the second power source is electrically isolated from the DC bus by the isolated second primary converter module.

26 Claims, 21 Drawing Sheets

U.S. PATENT DOCUMENTS

| | | | |
|---|---|---|---|
| 6,487,096 B1 | 11/2002 | Gilbreth et al. | 363/35 |
| 6,603,672 B1 | 8/2003 | Deng et al. | 363/37 |
| 6,761,987 B2 | 7/2004 | Marvin et al. | 429/13 |
| 6,949,843 B2 | 9/2005 | Dubovsky | 307/64 |
| 7,057,376 B2 * | 6/2006 | Cook et al. | 323/207 |
| 7,117,044 B2 * | 10/2006 | Kocher et al. | 700/34 |
| 2002/0190525 A1 | 12/2002 | Worden et al. | 290/1 A |
| 2004/0051387 A1 | 3/2004 | Lasseter et al. | 307/80 |
| 2004/0145357 A1 | 7/2004 | Lynch et al. | 323/208 |
| 2005/0105229 A1 | 5/2005 | Deng et al. | 361/90 |

* cited by examiner

SYSTEM AND METHOD FOR ISOLATING SOURCES AND LOADS OF A POWER SYSTEM

BACKGROUND OF THE INVENTION

1. Field of the Invention

This disclosure generally relates to electrical power systems, and more particularly to power system architectures suitable for isolating sources and loads of a power system.

2. Description of the Related Art

Traditionally, electric power is generated in large amounts at remote, large capacity generation stations. Typically, such large power stations are located close to an energy source and accordingly, are remote from the end users who consume the electric power. To minimize costs associated with the transmission of the generated electrical power to the end users, voltage of the generated electrical power is stepped up to a relatively high voltage for transmission over a high-voltage transmission system or grid. Voltage of the received electric power is then stepped down to a voltage that is useable by the end user, such as 240 volts (v) or 120v.

However, it is increasingly difficult to build large power generation facilities and their associated high voltage, bulk power transmission line systems. For example, environmental pollution issues have made siting more difficult and very expensive, particularly when coal, gas, or hydro resources are located on remote, scenic public lands. Right of way for siting the high voltage, bulk power transmission line systems has become very difficult to procure.

An increasingly common trend in providing electric power to end users is the use of relatively small power generation units. Such smaller power sources may take advantage of readily available natural resources, such as solar energy, wind energy or geothermal energy. Smaller power sources may be referred to as distributed generator units when sited in close proximity to the end users of the electric power. Distributed generators may reduce or minimize transmission line facility costs.

Because of the wide variety of available resources used by smaller power sources, and because of the large number of manufacturers and vendors, there is relatively little uniformity in the design of the smaller power sources and/or their associated equipment. For example, some small power sources output alternating current (AC) power and other units output direct current (DC) power. Further, there is little uniformity in the output capacities, voltages and/or frequencies. For example, some small power sources may output power at a single phase voltage of 240 volts AC. Other small power sources may output three phase power at 480 volts AC. Some small power sources output AC power at a frequency of 60 cycles per second (Hz), typical of the standard frequency used in the United States, Mexico and Canada. Other types of small power sources output AC power at a frequency of 50 Hz, typical of the standard frequency used in Europe.

The above-described relatively small power sources may be electrically connected at a common location, such as at a substation that delivers power to the end users. When a relatively small power source is located near end users, it may be referred to as a distributed generator.

Electrically coupling a plurality of small power sources at a common location presents a variety of unique problems. Since there is little uniformity in the output characteristics of small power sources (i.e.; output voltage, frequency, or capacity), the interconnection equipment used to couple the small power sources to an AC power system will also vary widely. This interconnection equipment is very expensive. And, in many instances, the interconnection equipment is difficult and costly to install. For example, a plurality of co-located small power sources may have their grounding systems coupled together with external grounding connections or a common ground mat as a safety measure.

In some situations it may be very desirable to quickly electrically couple a plurality of power sources to a power system. For example, in the event of civil disorder, a natural disaster or marshal law event, the existing power supply may be disrupted. Repairing and restoring the damaged power system may take a very long time. Although some types of power sources are portable, it is problematic that interconnection facilities for connecting the mobile power sources to the power system will be readily available, and available in the most desirable locations.

Further, changes in operating conditions of one of the plurality of electrically connected small power sources will likely influence performance of other commonly located small power sources. For example, a voltage fluctuation on one small power source will, to some degree, cause a voltage fluctuation in the other small power sources. A fault or failure of a component in one small power source, or its associated equipment, may cause the voltage to collapse to zero volts or near zero volts until protective equipment isolates the faulted component. If the voltage fluctuation is sufficiently severe, some or all of the other small power sources may be forced off line. In a relatively small, electrically weak system, the voltage collapse will more readily propagate to the other small power sources and their associated equipment.

Accordingly, although there have been advances in the field, there remains a need in the art for electrically coupling a plurality of distributed generators at a common location. Some of the embodiments disclosed herein address these needs and provides further related advantages.

BRIEF SUMMARY OF THE INVENTION

In one aspect, an embodiment may be summarized as an input power control (IPC) module for transferring power from a plurality of power sources to an alternating current (AC) system comprising a direct current (DC) bus operable at a DC bus voltage, a non-isolated first primary converter module electrically coupled to the DC bus and operable to receive a first amount of power from a first power source, and operable to convert the received power from the first power source into a first amount of DC power at the DC bus voltage, and an isolated second primary converter module electrically coupled to the DC bus and operable to receive a second amount of power from a second power source, and operable to convert the received power from the second power source into a second amount of DC power at the DC bus voltage, wherein the second power source is electrically isolated from the DC bus by the isolated second primary converter module.

In another aspect, an embodiment may be summarized as an input power control (IPC) module for transferring power from a plurality of power sources to an alternating current (AC) system comprising a direct current (DC) bus operable at a DC bus voltage, and at least two primary converter modules coupled to the DC bus and operable to receive power from the plurality of power sources, and operable to convert the received power into DC power at the DC bus voltage, wherein a first one of the plurality of primary converter modules does not electrically isolate its respective power source from the DC bus, and wherein the remaining primary converter modules electrically isolate their respective power sources from the DC bus.

In another aspect, an embodiment may be summarized as a method of transferring power from a plurality of power sources to an alternating current (AC) power system through an input power control (IPC) module comprising converting a first amount of power, received from a first power source through a first primary converter module coupled to a direct current (DC) bus, into a first amount of DC power; converting a second amount of power, received from a second power source through a second primary converter module coupled to the DC bus, into a second amount of DC power; converting the first and the second amounts of DC power into AC power; transferring the AC power to the AC power system through a secondary converter module coupled to the DC bus; electrically isolating the second primary converter module from the DC bus; and electrically isolating the secondary converter module from the DC bus.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

Figure 1:
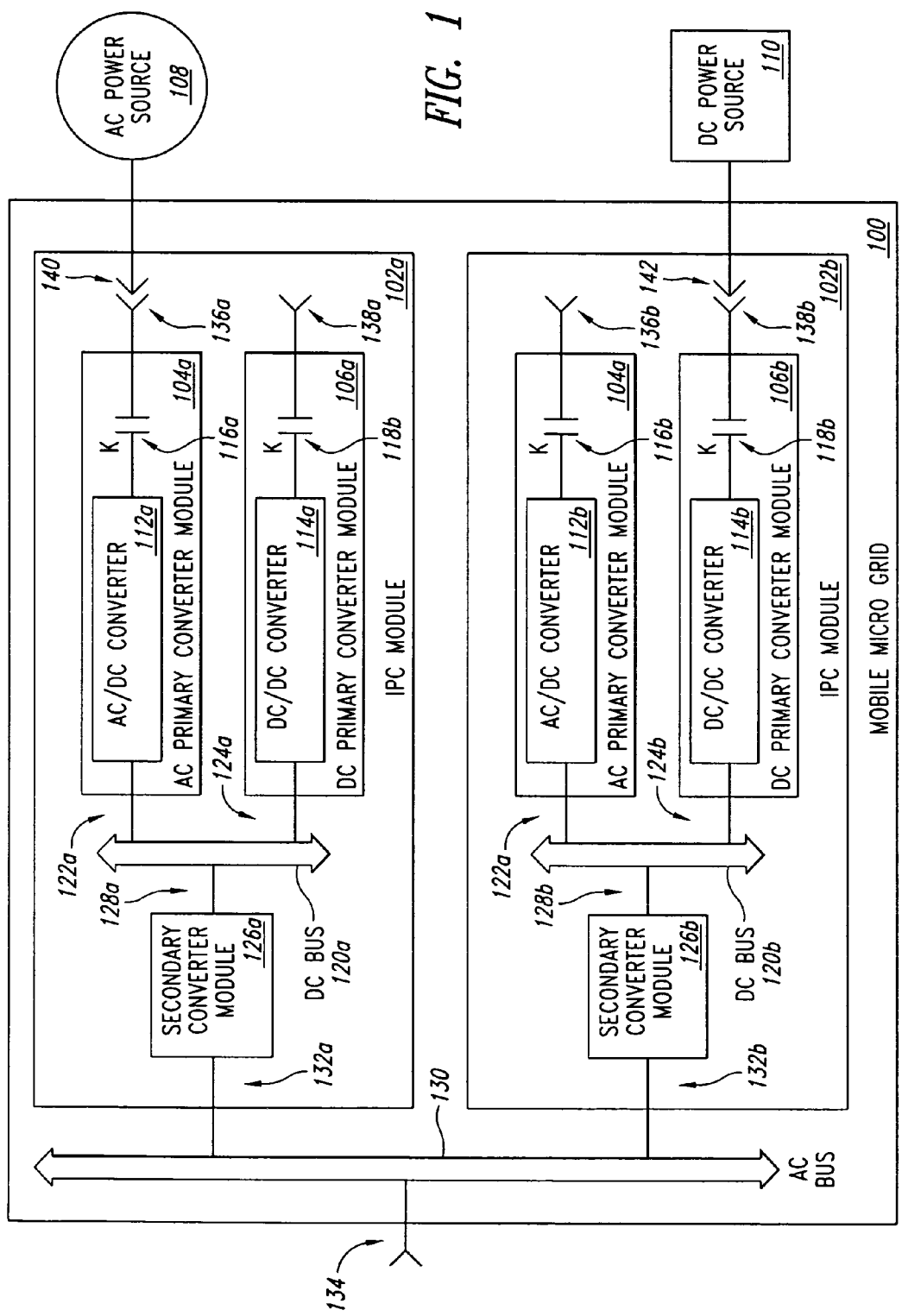
FIG. 1 is a block diagram of a simplified electric machine and a power system according to one illustrated embodiment.

In the following description, certain specific details are set forth in order to provide a thorough understanding of various embodiments. However, one skilled in the art will understand that the invention may be practiced without these details. In other instances, well-known structures associated with power converters, transformers, contactors, relays, circuit breakers, controllers and/or gate drives have not been shown or described in detail to avoid unnecessarily obscuring descriptions of the embodiments.

Furthermore, for convenience, reference numerals may be followed by letter indices to indicate a specific referenced location on a Figure. For example, reference numerals for the input power control (IPC) modules 102a, 102b refer to the upper and lower modules, respectively, illustrated in FIG. 1. General references to embodiments of an IPC module employ the reference numeral "102" without the additional letter indicia.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

FIG. 1 is a block diagram of selected portions of a mobile micro grid 100. Illustrated are two of a plurality of IPC modules 102a, 102b residing in the mobile micro grid 100. Each IPC module 102 includes at least an alternating current (AC) primary converter module 104 and a primary direct current (DC) converter module 106. A preferred embodiment has four IPC modules 102, with three primary converter modules in each IPC module 102.

An AC primary converter module 104 is operable to receive AC power from an external AC power source 108. Nonlimiting examples of AC power source 108 include a distributed generator, micro-turbine, a rotating machine or another suitable single-phase, split-phase, or three-phase AC power source.

A DC primary converter module 106 is configured to receive DC power from an external DC power source 110. Nonlimiting examples of DC power source 110 include an array of fuel cells, battery cells, ultracapacitors, photovoltaic cells, or DC machines.

In selected embodiments, only one external power source may be operatively coupled to a primary converter module 104, 106. Accordingly, the remaining primary converter modules in an IPC module 102 are locked out or otherwise disabled so that those primary converter modules are not used. As illustrated in FIG. 1, because the AC power source 108 is coupled to the IPC module 102a via the AC primary converter module 104a, the DC primary converter module 106a can not be used. Similarly, because the DC power source 110 is coupled to the IPC module 102b via the DC primary converter module 106b, the AC primary converter module 104b can not be used.

In other embodiments, multiple external power sources may be operatively coupled to a single IPC module 102. For example, generally referencing FIG. 1, such an embodiment could have the AC power source 108 coupled to the IPC module 102a via the AC primary converter module 104a, and the DC power source 110 coupled to the IPC module 102a via the DC primary converter module 106a. As described in greater detail below, some embodiments of an IPC module have three primary converter modules, the third primary converter module being configured to couple to an AC power source (with at least one operating characteristic different from the above-described AC power source 108), or being configured to couple to a DC source (with at least one operating characteristic different from the above-described DC power source 110).

The phrase "external power source" as used herein refers to a power source that is separate from the mobile micro grid 100. Accordingly, external power sources are physically coupled to the mobile micro grid 100 as described hereinbelow. It is appreciated that the phrases "external power source" and "power sources" may be used interchangeably herein.

Since the mobile micro grid 100 comprises a plurality of IPC modules 102 each configured to receive AC power or DC power from different types of power sources, embodiments of the mobile micro grid 100 may be transported to an installation site, AC power system substation or the like without any before-hand knowledge of the electrical characteristics of the power sources. For example, in a natural disaster recovery scenario, civil disorder, or military disorder, the choice and availability of power sources may be limited. Depending upon the embodiment, an IPC module 102 may be operable to receive three phase AC power, single phase or split phase AC power, DC power, or any combination of these. Furthermore, the IPC module 102 is operable to receive power at a variety of source voltages, and/or at different sources frequencies, such as 50 hertz (Hz) or 60 Hz.

A mobile micro grid 100 is mobile or transportable. Mobility may be provided in any suitable manner by co-locating a plurality of IPC modules on a transport member. Any suitable transport member may be employed, such as, but not limited to, a platform, skid, frame structure, housing, container or the like. Accordingly, any suitable transportation means may be used to move the plurality of IPC modules co-located on a transport member. For example, a mobile micro grid 100 may include wheels so that it may be towed by a vehicle. Railroad car wheels may be employed for rail transportation. As another example, the mobile micro grid 100 may be mounted on a suitable flatbed, skid, or container for loading onto another mobile vehicle, such as a trailer or the like. Accordingly, in the above-described natural disaster recovery scenario, one or more mobile micro grids 100 may be transported to the disaster site relatively quickly (in comparison to the time required for constructing traditional electrical connection facilities). If needed, a plurality of mobile micro girds 100 may be co-located at a point where access to an AC power system 218 (FIG. 2) is available.

As long as the power output capacity of a power source is less than or equal to the transfer capacity rating of an IPC module 102, the power source may be electrically and physically coupled to a selected one of IPC modules 102 of the mobile micro grid 100. In the event that the power output capacity of the power source is greater than the capacity rating of an IPC module 102, the power source may be coupled to two or more IPC modules 102 such that each of the IPC modules 102 transfers a portion of the power from the connected power source, as described in greater detail hereinbelow.

Furthermore, since each IPC module 102 is electrically isolated from other IPC modules 102, reliability is improved in that an IPC module 102 can be electrically and physically isolated in the event of a contingency at it's respective connected power source. Also, grounding systems and/or neutral systems of connected power sources are isolated from each other and from the grounding system and/or neutral system of the AC power system 218.

Figure 2:
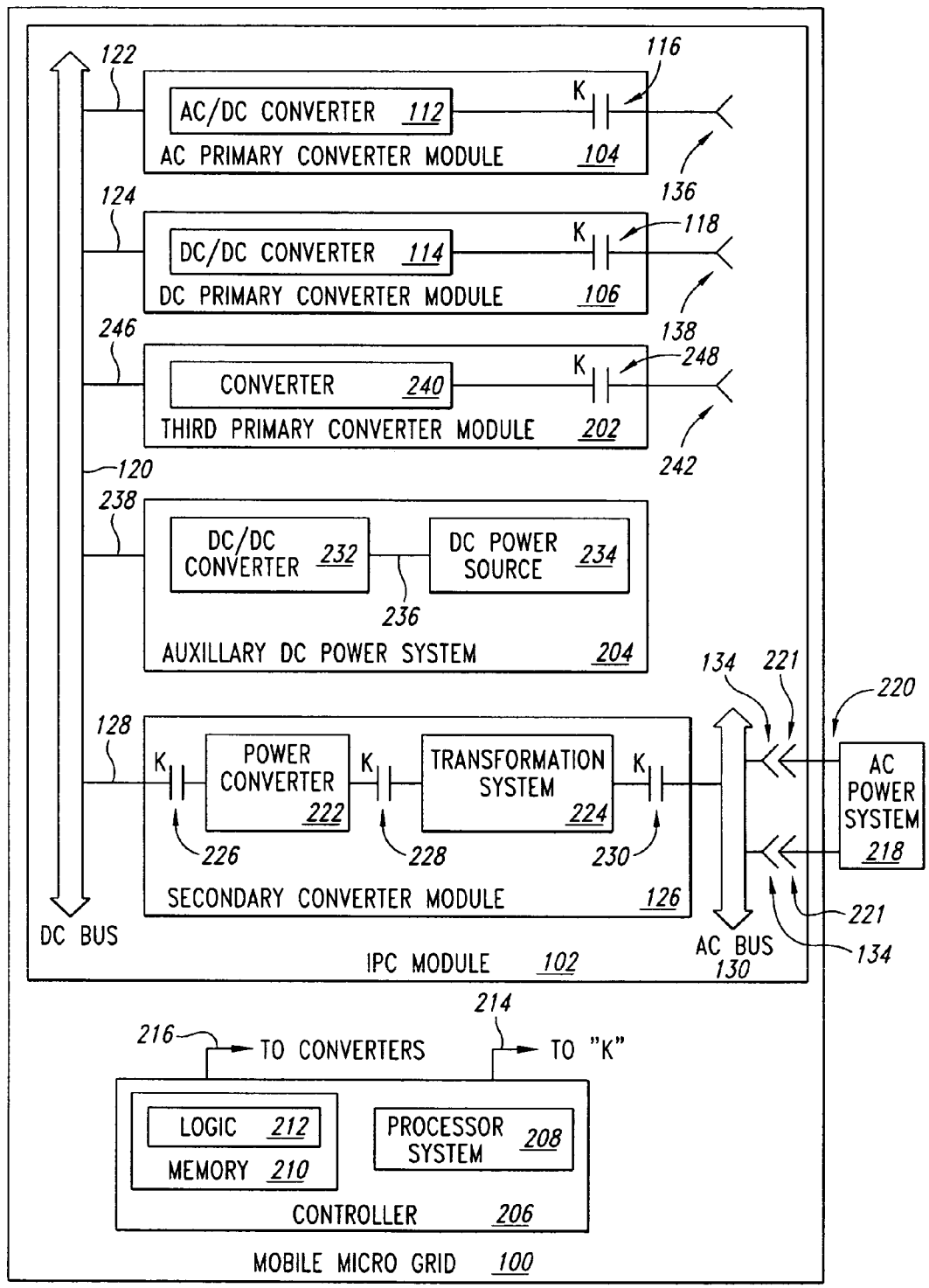
FIG. 2 is a block diagram of additional components of the mobile micro grid.

Returning now to FIG. 1, the AC primary converter module 104 comprises an alternating current to direct current (AC/DC) converter 112. The DC primary converter module 106 comprises a direct current to direct current (DC/DC) converter 114. The AC primary converter module 104 and the DC primary converter module 106 may each include at least one controllable switch device 116, 118, respectively, that is controllable by a controller 206 (FIG. 2). For convenience, the converters 112 and 114 may also be referred to as primary converters.

The output of the AC/DC converter 112 is DC power that is transferred to the DC bus 120, at a primary converter module site 122 on the DC bus 120. Similarly, the output of the DC/DC converter 114 is DC power that is transferred to the DC bus 120, at a primary converter module site 124 on the DC bus 120. The output DC power from the primary converters 112 and 114 is at a nominal DC voltage corresponding to the nominal operating voltage of DC bus 120.

DC power received from the primary converters 112, 114 is transferred to a secondary converter module 126, via the DC bus 120 and connection 128. The secondary converter module 126 is coupled to AC bus 130, via connection 132. Accordingly, power received from a plurality of power sources may be aggregated onto the AC bus 130 for transfer to an AC power system 218 (FIG. 2), via the AC output connectors 134.

As noted above, the AC primary converter modules 104 are operable to be electrically and physically coupled to a variety of AC power sources via convenient-to-use AC connectors 136. In FIG. 1, IPC module 102a is illustrated as coupled to AC power source 108, via connectors 136a, 140. If the AC power source 108 provides three phase AC power, then connectors 136a, 140 provide physical coupling points for receiving A phase (ø), Bø, Cø power, and for coupling to a ground or neutral point from corresponding terminals of the AC power source 108, illustrated for convenience as a single AC connector 136.

The DC primary converter modules 106 are operable to be electrically and physically coupled to a DC power source, via DC connectors 138, 142. In FIG. 1, IPC module 102b is illustrated as coupled to DC power source 110, via connectors 138b, 142. Since the DC power source 110 provides DC power, connection 132b provides physical coupling points for receiving positive DC (+DC) and negative DC (−DC) voltage from corresponding terminals of the DC power source 110, illustrated for convenience as the single connector 138.

As noted above, the primary converter modules 104, 106, 202 (FIG. 2) employ connectors 136, 138 and 242, respectively, for electrically and physically coupling to external devices or systems. The connectors 136, 138 and 242, their associated counterpart connectors from the power sources are physical connectors that may be securely fastened together to provide a reliable electrical connection. In some embodiments, spade type connectors may be employed which use frictional contacts to secure the electrical connection between connectors. In other embodiments, a plug-in type male and female connector apparatus device may be used. In yet other embodiments, a lug and nut apparatus may be employed to secure connectors. Any suitable type of connector may be used.

Furthermore, the above-described connectors of the mobile micro grid 100 are readily accessible to personnel coupling the connectors to the various power sources or other devices. The IPC modules 102 reside in a suitable enclosure. Accordingly, the connectors may protrude from the enclosure. In other embodiments, the connectors are recessed into the enclosure. Furthermore, alpha-numeric text or other suitable indicia may be placed on the enclosure in proximity to the connectors to indicate to personnel the nature of the connectors. For example, with reference to FIG. 5 below, the AC primary converter module 104 is operable to receive three-phase AC power, as illustrated by the A, B and C phase (ø) connectors. A ground (GND) connector is also provided. These and other connectors are clearly labeled so that personnel coupling the AC power source 108 to AC primary converter module 104 understand which connectors should be used.

In some embodiments primary converter module sites 122, 124, 246 may comprise standard connectors, and the primary converter modules 112, 114, 202, respectively, may be coupled to the DC bus 120 through these standardized sites. That is, primary converter modules 112, 114, 202 may be easily replaceable and/or removable. An IPC module 102 could be therefore be configured for accepting power from various power sources quickly and easily. For example, if an IPC module 102 is to be used where there are two DC power sources and one single-phase AC power source available, the IPC module 102 could be quickly configured for this situation by simply connecting the correct types of primary converter modules to the appropriate sites 122, 124, 246 on the DC bus 120. If the same IPC module 102 is later to be used with one AC single-phase power source, one three-phase power source, and one DC power source, one of the DC primary converter modules can be simply removed by disconnecting it from its respective site on the DC bus 120 (using connectors 144 such as those at sites 122, 124, 246), and the appropriate primary converter module (in this case a three-phase AC primary converter module) could be coupled to the DC bus 120 in its place. Using standard connectors 144 at sites 122, 124, 246 could therefore make certain primary converter modules interchangeable. Each IPC module 102 can therefore be reconfigured with different input ports (by exchanging primary converter modules) to adapt to a wide range of power sources. This provides the flexibility of using whatever power sources become available in a particular situation.

FIG. 2 is a block diagram of additional components of the mobile micro grid 100. The illustrated IPC module 102 comprises the above-described AC primary converter module 104, the above-described DC primary converter module 106, and a third primary converter module 202. Depending upon the embodiment, the third primary converter module 202 may be configured to receive either AC power or DC power. Also included in the IPC module 102 is an auxiliary DC power system 204. Various embodiments of the third primary converter module 202 and auxiliary DC power system 204 are described in greater detail hereinbelow.

A controller 206 resides in the mobile micro grid 100. Controller 206 comprises a processor system 208 and a memory 210. Logic 212 resides in memory 210 or in another suitable memory medium. Logic 212, described in greater detail hereinbelow, is executed by processor system 208 such that control signals are communicated to the various controllable switch devices (K) described herein, via connection 214, and to the various converters described herein, via connection 216. Processor system 208 may communicate control signals to gate control boards in the various converters described herein. Alternatively, processor system 208 may comprise a plurality of processors that drive the various power semiconductor devices in the gates of the various controllers described herein.

The secondary converter module 126 is operable to electrically and physically couple the AC bus 130, via the AC output connectors 134, to the AC power system 218. In the illustrated embodiment of the mobile micro grid 100, two transfer paths 220 are illustrated between the IPC module 102 and the AC power system 218. The two paths 220 are used so that electrical power may be more reliably transferred between the IPC module 102 and the AC power system 218. Accordingly, if one of the transfer paths 220 is inoperable, the remaining transfer path 220 is available to transfer at least a portion of the power. This reliability feature is described in greater detail hereinbelow.

In some embodiments, the secondary converter module 126 may be an isolated power converter. In other embodiments, isolation may be provided by a transformer. Thus, the DC bus 120 is electrically isolated form the power system 218 (FIG. 2)

The secondary converter module 126 comprises a power converter 222 operable to convert DC power transferred from the DC bus 120, received at the nominal DC voltage, into AC power at a nominal AC voltage of the AC power system 218. The power converter 222 is preferably an isolated DC/AC converter that provides grounding isolation between the DC bus 120 and the AC power system 218 in one exemplary embodiment. In the various embodiments, the above-described power converter 222 may be interchangeably referred to as an "output power converter" for convenience.

The secondary converter module 126 further comprises a transformation system 224 operable to convert the voltage of the AC power output by the DC/AC power converter 222 into an AC voltage used by the AC power system 218. Optional controllable switch devices 226, 228 and 230 are controllable to provide operational reliability, described in greater detail hereinbelow. For convenience, power converter 222 may also be referred to as a secondary converter.

The auxiliary DC power system 204 comprises a DC/DC converter 232 and an auxiliary DC power storage device 234. The DC power storage device 234 is coupled to the DC/DC converter, via connection 236. The DC/DC converter 232 is coupled to the DC bus 120, via connection 238 and transforms DC voltage from the nominal DC voltage of the DC bus 120 to the operating voltage of the DC power storage device 234. The DC power storage device 234 is operable to provide power to (source), or receive power from (sink), the DC bus 120.

Auxiliary DC power storage device 234 may be a relatively small DC energy storage device that may be conveniently mounted within an IPC module 102. Examples of auxiliary DC power storage device 234 include, but are not limited to, a battery or an ultracapacitor. The DC power storage device 234 is operable to provide power to auxiliary loads or to provide load following capability, described in greater detail hereinbelow.

The third primary converter module 202 includes a converter 240 and a connector 242 for electrically and physically coupling to an external power source. Depending upon the embodiment of the mobile micro grid 100, the converter 240 may be operable to receive AC power from an AC power source, or may be operable to receive DC power from a DC power source. Various embodiments of the third primary converter module 202 are described in greater detail hereinbelow.

To illustrate some of the benefits of a mobile micro grid 100, an illustrative hypothetical application of the mobile micro grid 100 is now described. Each of the IPC modules 102 in this hypothetical application are configured to have an operating capacity of 100 kilowatts (kW). Accordingly, the AC primary converter module 104 and the DC primary converter module 106 are each individually rated at a 100 kW capacity. Thus, a variety of AC or DC power sources may be electrically and physically coupled to a single IPC module 102 so long as the capacity of the power source is less than or equal to 100 kW. In this hypothetical example, consider the situation wherein the capacity and the operating parameters of individual distributed generators are unknown before the mobile micro grid 100 is transported to the installation site. Because a wide variety of AC or DC power sources may be electrically and physically coupled to an IPC module 102, the mobile micro grid 100 may be transported to the installation site without before-hand knowledge of the operating characteristics of the power sources.

In this hypothetical example, assume that an AC power source 108 and a DC power source 110 (FIG. 1) are to be electrically coupled to the AC power system 218 (FIG. 2). Power sources 108 and 110 are to provide power to loads (not shown) residing in the AC power system 218.

In a conventional interconnection system, considerable effort in designing, selecting and procuring the interconnection equipment is required to ensure suitable interconnection of the power sources 108 and 110. For example, the interconnection facilities required to interconnect AC power source 108 will be different from the interconnection facilities required to interconnect DC power source 110 to the AC power system 218. Further, designing, specifying and procuring the interconnection equipment may be done only after the characteristics of the power sources 108, 110 are known. Once known, the interconnection facilities will have to be individually installed at the interconnection site at considerable expense and time.

Alternatively, the mobile micro grid 100 may be easily transported to a convenient location at the interconnection site. Then, available power sources are electrically and physically coupled to one (or more) of the IPC modules 102. The secondary converter module 126 is electrically and physically coupled to the AC power system 218. As noted above, the power sources may be of varying types. Coupling the mobile micro grid 100, accordingly, can be accomplished in a minimal amount of time and cost, and without the need to individually design, specify, procure and install unique interconnection facilities for each different type of power source.

Figure 3:
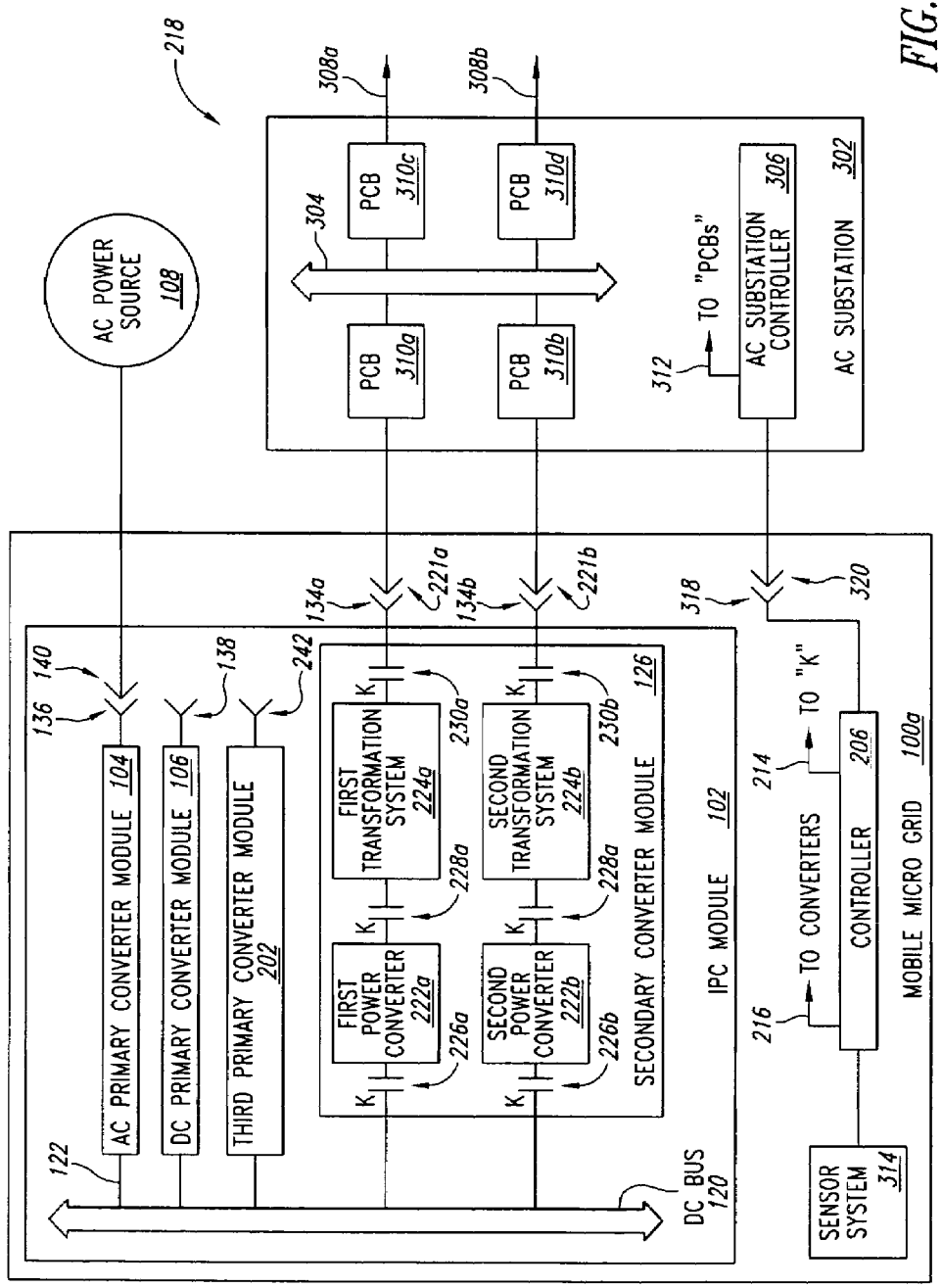
FIG. 3 is a block diagram of an alternative embodiment of a mobile micro grid that provides for a greater degree of reliability in the connection of the secondary converter module to the AC power system.

FIG. 3 is a block diagram of an alternative embodiment of a mobile micro grid 100a that provides for a greater degree of reliability in the connection between the secondary converter module 126 and the AC power system 218. The mobile micro grid 100a is configured to provide single contingency (n–1) reliability for outages of components residing in the secondary converter module 126. Accordingly, the secondary converter module 126 comprises a first power converter 222a and a second power converter 222b. The power converters 222a and 222b are respectively electrically coupled to a first transformation system 224a and a second transformation system 224b.

A contingency is an unplanned outage of a system or component. The outage may be caused by a variety of events. For example, a component failure may occur and/or an electrical fault may occur. Or, a device misoperation, such as improper functioning of controller 306 or 206, may occur. There are many possible events that may cause a contingency, and such events are too numerous to conveniently describe herein.

The first and second power converters 222a, 222b may be electrically and physically isolated from the DC bus 120 through operation of their respective controllable switch devices 226a, 226b. The first and second power converters 222a, 222b may be electrically isolated from their respective first and second transformation systems 224a, 224b by operation of the controllable switch devices 228a, 228b. The first and second transformation systems 224a, 224b may be electrically isolated from the AC power system 218 by operation of the controllable switch devices 230a, 230b, respectively. Accordingly, a single contingency outage of a component within the secondary converter module 126 can be isolated by selectively opening the controllable switch devices such that the remaining components may continue operation to transfer power from the power source to the AC power system 218.

For example, if a component residing in the first power converter 222a fails, controller 206 may detect the failure and communicate signals to controllable switch devices 226a and/or 228a such that they are opened, thereby disconnecting the first power converter 222a. Once the first power converter 222a has been isolated, power may be transferred through the IPC module 102 via the second power converter 222b and the second transformation system 224b. (The amount of power that may be transferred corresponds to the smallest rating of the serially connected second power converter 222b, second transformation system 224b, and controllable switch devices 226b, 228b, and 230b.)

As another example of isolation, voltages of the external power system may be maintained for various operating conditions, such as an abrupt load change on the AC power system or a change in another power source coupled to the mobile micro grid 100. The power converter 222 and/or the primary converter 112, 114 in the AC primary converter module 104 may be regulated by the controller 206 so that the source voltage of the external power source 108, 110 is maintained at a desired value. That is, voltage fluctuations on the AC power system 218, or on another power source, will not propagate through to the other external power sources since the controller 206 may regulate the various converters to maintain the voltage of the DC bus 120 and accordingly, maintain the source voltage of the external power sources.

As yet another example of isolation, the source frequency of an AC power source 108 may be maintained for various operating conditions, such as an abrupt load change on the AC power system 218 or a change in another power source coupled to the mobile micro grid 100. The controller 206 may regulate the various converters to maintain the source frequencies of the AC power source 108 when frequency fluctuations occur on the AC power system 218, or on another AC power source, because the DC bus 120 operates independently of AC frequencies of the AC power source 108 and the AC power system 218.

In the embodiment of the mobile micro grid 100a illustrated in FIG. 3, power from the external power sources are transferred through the mobile micro grid 100a to an AC substation 302. AC substation 302 comprises an AC bus 304 and a controller 306. The AC bus 304 is operable at an AC voltage suitable for transferring power over transmission lines 308a, 308b. A plurality of power circuit breakers (PCBs) 310a-310d are employed to isolate the AC bus 304 from the various devices coupled to the AC substation 302 in the event of a contingency.

PCBs 310a and 310b provide physical and electrical isolation between the AC bus 304 and the secondary converter module 126. PCBs 310c and 310d isolate the AC bus 304 from the transmission lines 308a, 308b, respectively. For example, if transmission line 308a experiences a contingency, such as a fault, the controller 306 detects the contingency condition on transmission line 308a and communicates a control signal to PCB 310c, via connection 312, such that PCB 310c is opened to isolate the AC substation 302 from the faulted transmission line 308a. As another example, if a component in the first transformation system 224a experiences a contingency, such as a fault, and if the controller 306 detects the contingency condition, PCB 310a will be opened to isolate the AC substation 302 from the faulted transformation system 224a.

Contingency events are detectable using a variety of well-known devices and systems, generally represented as sensor system 314. Accordingly, signals are communicated from the sensor system 314 to controller 206, which may be used to determine the occurrence of a contingency event. Detailed description of sensor system 314, which may also be referred to as a protection system, is not provided herein for brevity.

For convenience, AC substation 302 is illustrated as a single AC bus substation. There are many other possible configurations of AC substation 302, such as, but not limited to, a ring bus configuration, a main and transfer bus configuration, or a breaker-and-half bus configuration. Any suitable AC substation configuration may be physically and electrically coupled to embodiments of the mobile micro grid 100 using suitable connectors 221.

The steady-state capacity rating of an IPC module 102 is definable by the steady-state capacity ratings of the components residing therein. Generally, the steady-state capacity rating is based upon the component that has the smallest capacity rating in a serial chain of components. For parallel components, the rating generally may be defined as the sum of the capacity ratings of the parallel components.

For example, in an IPC module 102, the primary converter modules 104, 106, 202 are each in series with the DC bus 120 and the secondary converter module 126. Preferably, the steady-state capacity ratings of the DC bus 120 and the secondary converter module 126 will be greater than the steady-state capacity rating of the primary converter modules 104, 106, 202.

Capacity ratings may be defined using various criteria. For example, a single contingency capacity rating may be defined under a presumption of a component contingency. For example, the steady-state capacity rating of the first power converter 222a and its corresponding first transformation system 224a is equal to the smaller of the two capacity ratings. Similarly, the capacity rating of the second power converter 222b and its associated second transformation system 224b is also rated at the capacity rating of the component having the smaller capacity rating. Since the first power converter 222a (and its corresponding first transformation system 224a) is operating in parallel with the second power converter 222b and its associated second transformation system 224b, the steady-state capacity rating of the secondary converter module 126 may be defined by the sum of the capacity ratings of the first and second power converters 222a, 222b. Preferably, the steady-state capacity rating of the transformation systems 224 are greater than or equal to the steady-state capacity rating of the power converters 222 since pre-designed manufactured transformers are readily available from various vendors.

If a single contingency occurs in one of the power converters 222a, 222b, the power converter 222 experiencing the contingency is isolated as described above. However, the secondary converter module 126 is still able to continue transferring power through the remaining power converter 222. Accordingly, the single contingency rating may be defined as the rating applicable to the remaining power converter 222. If both power converters 222 have identical capacity ratings, the single contingency capacity rating of the secondary power converter module 126 is one half (50%) of its steady-state capacity rating.

In some embodiments, it is desirable to have the steady-state capacity ratings of each of the power converters 222 and its associated second transformation system 224 be equal to the defined capacity rating of the IPC module 102. Accordingly, the PC module 102 will have sufficient transfer capacity to transfer all of the power generated by the power source in the event of a single contingency occurring anywhere in the secondary converter module 126.

In the event of a single contingency in an IPC module 102 where the steady-state capacity rating is reduced to the single contingency capacity rating, and if power output of the external power source exceeds the single contingency capacity rating, power output from the external power source may be reduced to continue reliable operation. Generally, depending upon the location of the contingency, the capacity rating of the mobile micro grid 100 will have to be reduced from its steady-state capacity rating to a lesser, single contingency capacity rating. As will be described in greater detail hereinbelow, a significant benefit is that the mobile micro grid 100 may continue to transfer, at least partially, power from its connected external power sources to the AC power system 218 under a variety of contingency situations.

FIG. 3 further illustrates that the controller 206 residing in the mobile micro grid 100a may be communicatively coupled to the AC substation controller 306, via connectors 318, 320. The AC substation controller 306 is operable to control selected components of the AC substation 302 (such as the PCBs 310a-d), is operable to receive information from detectors or meters (not shown) in the AC substation 302 (such as current, voltage or power meters) and/or is operable to received information from remote devices in the AC power system 218. In some situations, it is desirable to enable communications between the controller 206 and the AC substation controller 306. For example, but not limited to, information received from current, voltage or power sensors or meters in the AC substation 302 may be transferred to the controller 206. As another non-limiting example, if a contingency occurs on a component of the mobile micro grid 100a, one of the PBCs 310 may be used to interrupt current flowing through the faulted component of the mobile micro grid 100. For instance, if a fault occurs in the second transformation system 224b, controller 206 may communicate a signal to the AC substation controller 306 such that the PCB 310b operates to open the path between the second transformation system 224b and the AC substation bus 304, thereby interrupting fault current flowing into the fault from the AC power system 218. PCBs are very robust devices capable of interrupting large amounts of fault current. Coordination between the controller 206 and the AC substation controller 306 allows the mobile micro grid 100a to operate without having its own PCBs.

Figure 4:
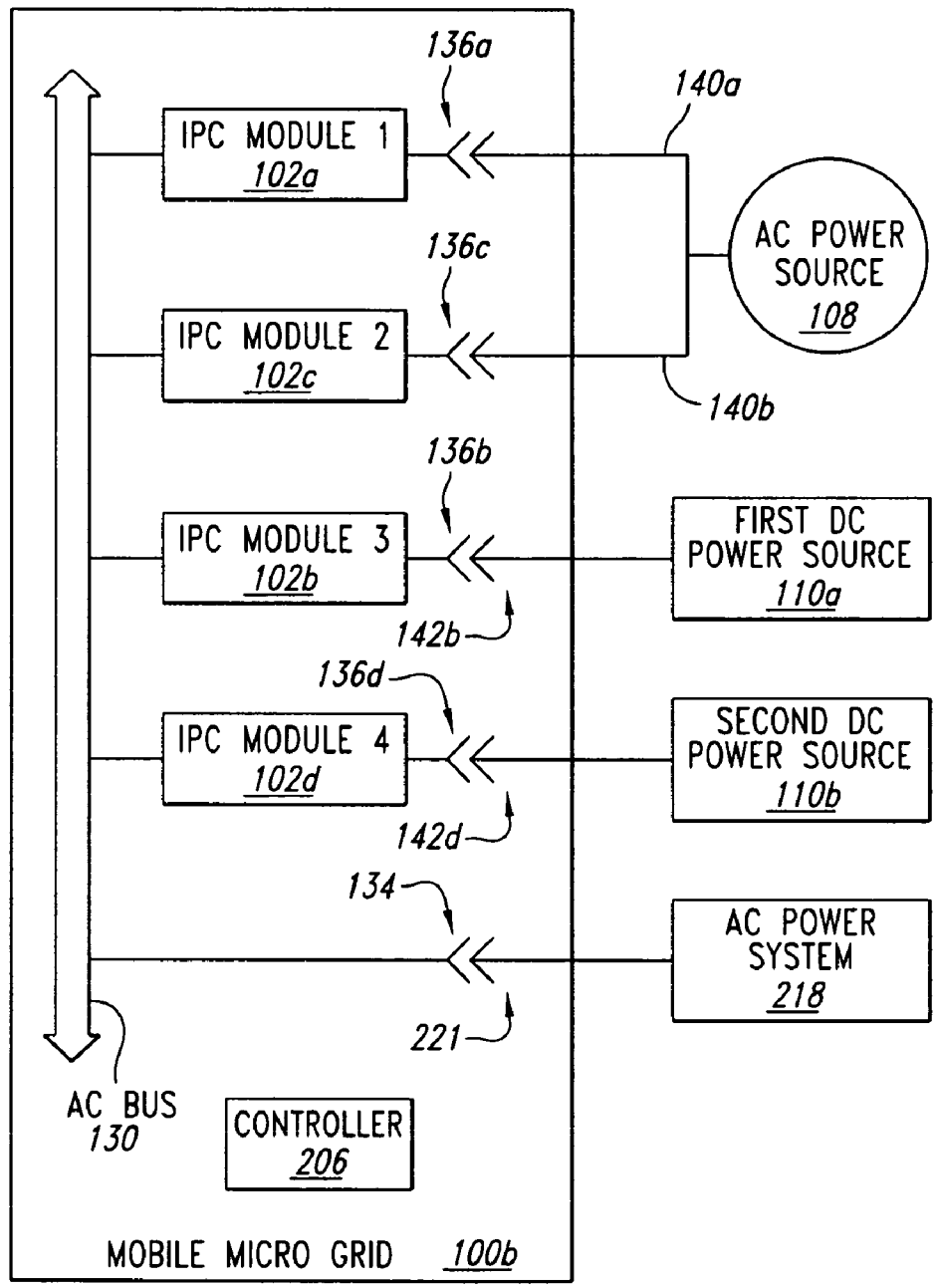
FIG. 4 is a block diagram of an alternative embodiment of a mobile micro grid comprising four IPC modules.

FIG. 4 is a block diagram of an alternative embodiment of a mobile micro grid 100b comprising four IPC modules 102a-102d. Mobile micro grid 100b illustrates the great degree of flexibility in transferring power from various types of power sources to the AC power system 218.

In this exemplary embodiment, the rated output power capacity of the AC power source 108a is greater than the steady-state capacity rating of individual IPC modules. Here, the AC power source 108a is coupled in parallel with the IPC modules 102a and 102c. Accordingly, in this exemplary embodiment, the actual power output of the AC power source 108a should be equal to or less than the sum of the steady-state capacity ratings of the IPC modules 102a and 102c. If the power output capacity of the AC power source 108a is greater than the sum of the steady-state capacity ratings of the IPC modules 102a and 102c, the AC power source 108a could be operated up to the sum of the capacity ratings of the DC modules 102a, 102b. However, if the output power capacity rating of the AC power source 108a is greater than the sum of the steady-state capacity ratings of the IPC modules 102a and 102c, the AC power source 108a could be further coupled to one or more of the remaining IPC modules 102b or 102d, or may be coupled to IPC modules 102 of another mobile micro grid (not shown).

In this exemplary embodiment, the IPC module 102b is coupled to the first DC power source 110a, via connector 136b. Similarly, the IPC module 102d is coupled to the second DC power source 110b, via connector 136d. The secondary converter module 126 is coupled to the AC power substation 302 via connector 134. It is appreciated that if the first DC power source 110a is significantly different from the second DC power source 110b, then the DC primary converters used for coupling to the DC power sources 110a, 110b may be different. Such an exemplary embodiment is described in greater detail below.

It is appreciated that if the power output capacity of one of the DC power sources 110a, 110b exceeds the steady-state capacity rating of individual IPC modules 102b, 102d, respectively, that the output power of DC power source 110 could be reduced to a value that does not exceed the steady-state capacity rating of the IPC modules 102 to which it is coupled to. Alternatively, the DC power source 110 could be coupled to one or more of the other IPC modules 102, or may be coupled to IPC modules 102 of another mobile micro grid (not shown), so that the DC power source 110 may be operated at a higher output.

Figure 5:
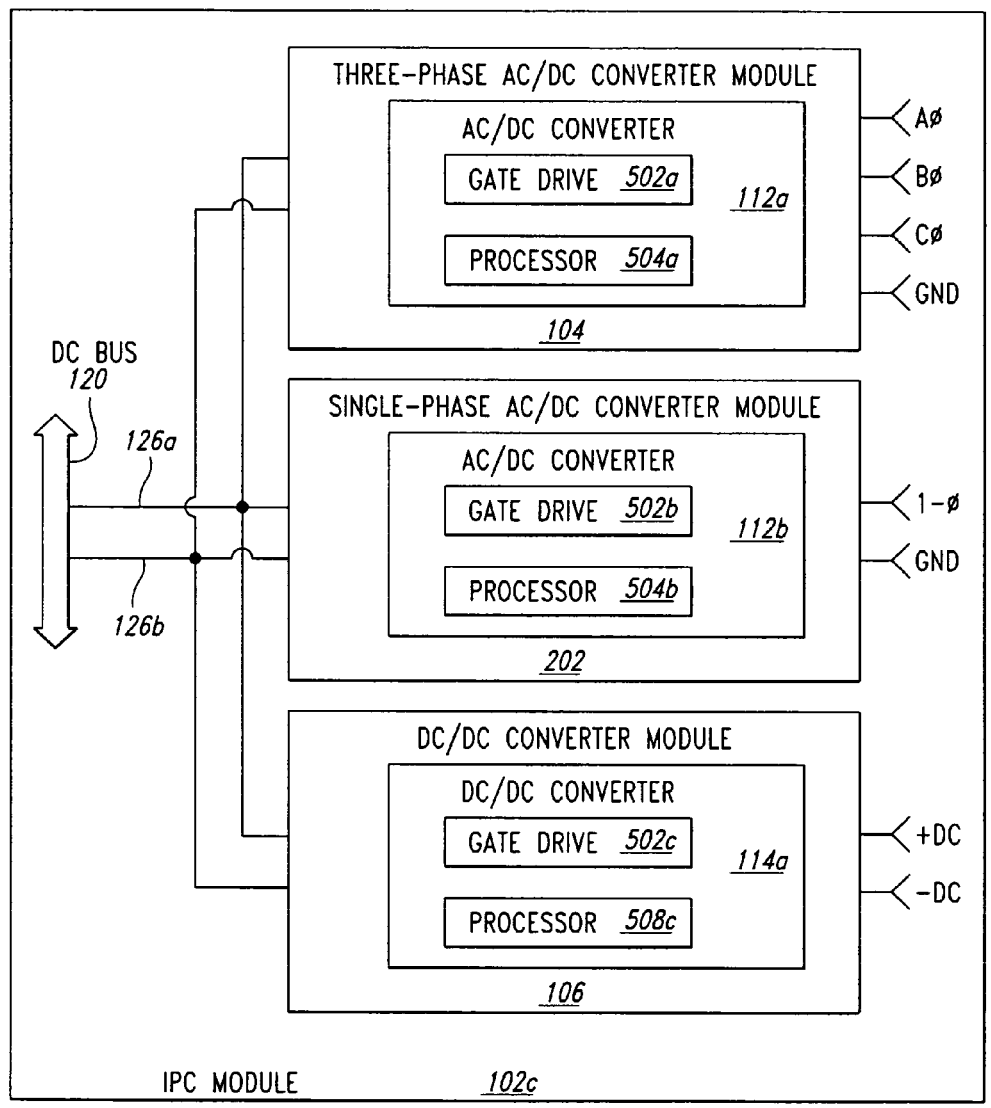
FIG. 5 is a block diagram illustrating selected components of an alternative embodiment of an IPC module comprising three primary converter modules.

FIG. 5 is a block diagram illustrating selected components of an alternative embodiment of an IPC module 102c comprising three primary converter modules 104, 106 and 202 (see also FIG. 2). AC primary converter module 104 is operable to receive three-phase AC power, as illustrated by the A, B and C phase (ø) connectors. A ground (GND) connector is also provided. Since the A, B, C and GND phase connectors are readily accessible from the outside of the mobile micro grid 100, a three-phase power source may be conveniently coupled to the AC primary converter module 104. Furthermore, the voltage rating and current rating of the connectors are sufficiently high enough to couple to a variety of power sources having different output voltages. An alternative embodiment of the AC primary converter module 104 and/or 202 may include an additional connector to couple to a neutral connector of the AC power source. Other alternative embodiments of the AC primary converter module 104 and/or 202 may include both a ground connector and a neutral connector.

The DC primary converter module 106 is operable to receive DC power, as illustrated by the positive DC (+DC) voltage and negative DC (−DC) voltage connectors. The AC primary converter module 202 operable to receive single-phase, AC power, as illustrated by the single phase (1−ø) connector and ground (GND) connectors.

Each primary converter module 104, 106 and 202 is operable to output DC power to the DC bus 120 (FIGS. 1-4), via connections 126a, 126b. Connection 126a operates at a positive DC voltage and connection 126b operates at a negative DC voltage. Summarizing, the IPC module 102c is operable to be coupled in the field to one of a variety of AC power sources or DC power sources without before-hand knowledge of the nature of the power source that resides at the remote site.

The converter modules 104, 202, 106 (as well as other converter modules described herein) have converters 112a, 112b and 114a, respectively, residing therein. The converters 112a, 112b and 114a comprise gate drives 502a, 502b and 502c, respectively, that perform power and/or voltage conversions. Such gate drives 502a, 502b and 502c are well known and are not described herein for brevity.

Some embodiments further include optional processors 504. The processors 504a, 504b and 504c are communicatively coupled to controller 206 (FIG. 2) and receive instruction signals or the like so that the processors 504a, 504b and 504c can control operation of their respective gate drives 502a, 502b and 502c. Alternatively, controller 206 may directly control the gate drives 502a, 502b and 502c using separate logical threads or the like.

Figure 6:
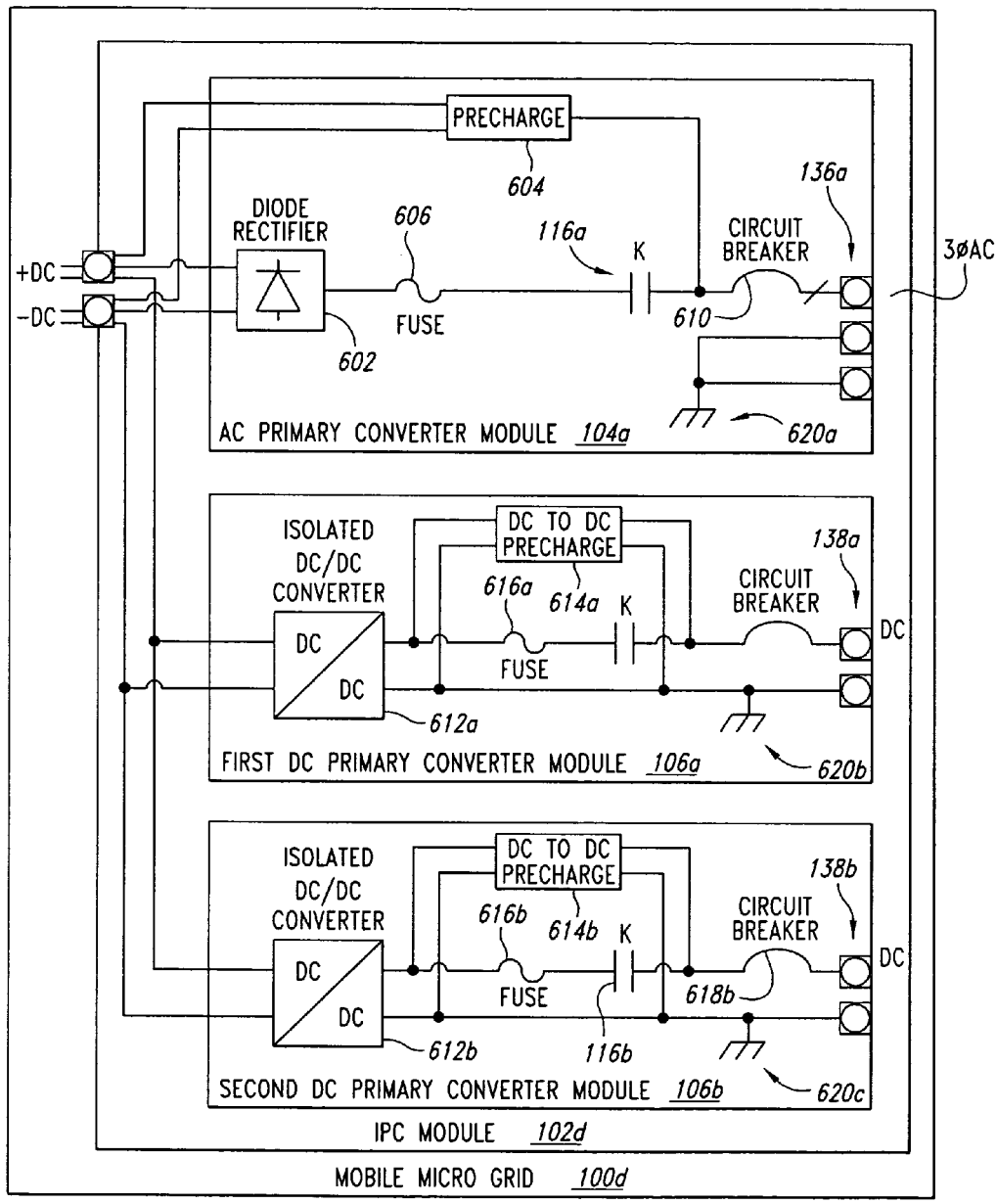
FIG. 6 is a block diagram of an alternative embodiment of the IPC module comprising a AC primary converter module, a first DC input module, and a second DC primary converter module.

FIG. 6 is a block diagram of an alternative embodiment of the IPC module 102d comprising an AC primary converter module 104a, a first DC primary converter module 106a, and a second DC primary converter module 106b. The AC primary converter module 104a may be configured to transfer three-phase AC power, via connectors 136a. The first DC primary converter module 106a and the second DC primary converter module 106b are operable to receive DC power from a DC power source. However, the first and second DC primary converter modules 106a, 106b are operable to receive different input voltages from a DC power source, as described in greater detail hereinbelow.

The AC primary converter module 104a comprises a diode rectifier 602, a precharge circuit 604, a fuse 606, a circuit breaker 608, and a controllable switch device 116a (described above). When the first AC primary converter module 104 is operable to receive three-phase, AC power, the connectors 136 correspond to the A, B, C, GND and neutral connectors (FIG. 5) described above. Accordingly, it is appreciated that the first AC primary converter module 104 is operable to receive AC power from a variety of AC power sources 108 (FIG. 1).

The first DC primary converter module 106a comprises an isolated DC/DC converter 612a, a DC/DC precharge circuit 614a, a fuse 616a, a circuit breaker 618a, and a controllable switch device 118a. The second DC primary converter module 106b comprises an isolated DC/DC converter 612b, a DC/DC precharge circuit 614b, a fuse 616b, a circuit breaker 618b, and a controllable switch device 118b. The above-described components of the first DC primary converter module 106a are operable to received DC power at a first range of DC operating voltages used by a DC power source. The above-described components of the second DC primary converter module 106b are operable to receive DC power at a second range of DC operating voltages used by another type of DC power source. Accordingly, this exemplary embodiment provides flexibility in that a relative wide range of operating DC voltage used by different types of DC power sources may be accommodated.

In an alternative embodiment, the diode 602 in an AC primary converter module 104a may include an isolated AC/DC converter. This alternative embodiment provides isolation for its respective external power source.

Figure 7:
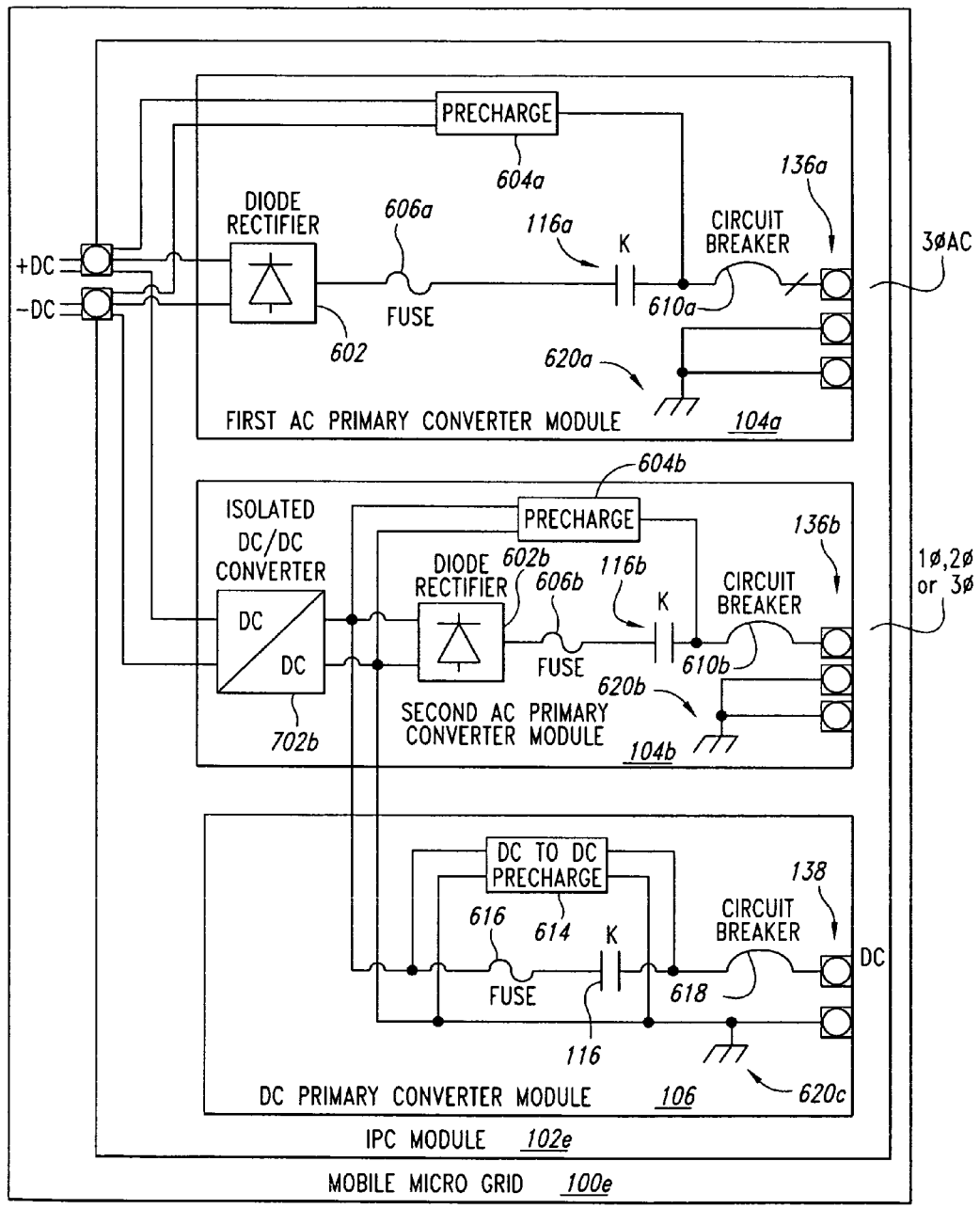
FIG. 7 is a block diagram of an alternative embodiment of the IPC module comprising a first AC primary converter module, a second AC primary converter module, and a first DC input module.

FIG. 7 is a block diagram of an alternative embodiment of the IPC module 102e comprising a first AC primary converter module 104a, a second AC primary converter module 104b, and a DC primary converter module 106. The first AC primary converter module 104a may be configured to transfer three-phase AC power, via connectors 136a. The second AC primary converter module 104b may be configured to transfer three-phase, two-phase or single-phase AC power from an AC power source, via connectors 136b. The DC primary converter module 106 is operable to receive DC power from a DC power source.

The first AC primary converter module 104a was described above and illustrated in FIG. 6, and is not described again for brevity. The second AC primary converter module 104b comprises a diode rectifier 602b, a precharge circuit 604b, a fuse 606b, a circuit breaker 608b, a controllable switch device 116b, and an isolated DC/DC converter 702b. The connectors 136b correspond to connectors for receiving single phase or split-phase power from an AC power source.

The first DC primary converter module 106 comprises a DC/DC precharge circuit 614, a fuse 616, a circuit breaker 618, and a controllable switch device 118. The first DC primary converter module 106 is coupled to the isolated DC/DC converter 702b residing in the second AC primary converter module 104b. Here, sharing the isolated DC/DC converter 702b may reduce overall cost and/or weight of the mobile micro grid 100e. In alternative embodiments, other selected components may be shared to further reduce cost and/or weight.

Each of the above-described primary converter modules 104, 106 in FIGS. 6 and 7 further include a ground 620. When coupled to an external power source 108, 110, the primary converter modules 104, 106 are commonly grounded to their respective external power source 108, 110. That is, the grounds 620 are at the same ground potential of their respective external power source 108, 110.

In some embodiments, the GND connectors of the converters 104, 202 are physically and electrically coupleable to the corresponding grounds of an AC power source 108. The −DC connector is physically and electrically coupleable to the −DC voltage of a DC power source 110, which may also be considered an equivalent to a ground when the −DC voltage corresponds to an earth return. Accordingly, when the primary converter modules 104, 106 of an IPC module 102 are coupled to external power sources, the IPC module 102 is grounded to that power source.

It is appreciated since the DC bus 120 is not grounded with the DC buses 120 of other IPC modules 120, that a plurality of external power sources 108, 110 are electrically isolated from each other. That is, when external power sources are electrically coupled to embodiments of the mobile micro grid 100, grounding systems of the external power sources 108, 110 are isolated via their respective primary converter modules 104, 106. Accordingly, in selected embodiments, when a plurality of IPC modules 102 are grounded to their respective power sources, the IPC module 102 and their respective power sources are independently grounded from each other. That is, the mobile micro grid 100 acts as a grounding isolation system to electrically isolate grounds 620a-c (FIGS. 6-7) of a plurality of IPC modules 102 and their respective external power sources 108, 110. Furthermore, since the DC bus 120 is not grounded, the grounding systems of the external power sources 108, 110, and their respective IPC modules 102, are electrically isolated from the AC power system 218. Accordingly, no current should circulate between a plurality of IPC modules through their ground connections.

In some embodiments, a first one of the primary converter modules 104, 106 may not be isolated. Since the secondary converter modules 126 and other primary converter modules 104, 106 are isolated, the external power source coupled to the non-isolated primary converter module is effectively isolated form other power sources and the power system 218 by virtue of the isolation provided by the secondary converter modules 126 and other primary converter modules 104, 106.

In some embodiments, the diode rectifier 602 illustrated in FIGS. 6 and 7 may be a non-isolating type of AC/DC converter. In other embodiments, the diode rectifier 602 may be replaced with other types of AC/DC converter devices (not shown).

Figure 9:
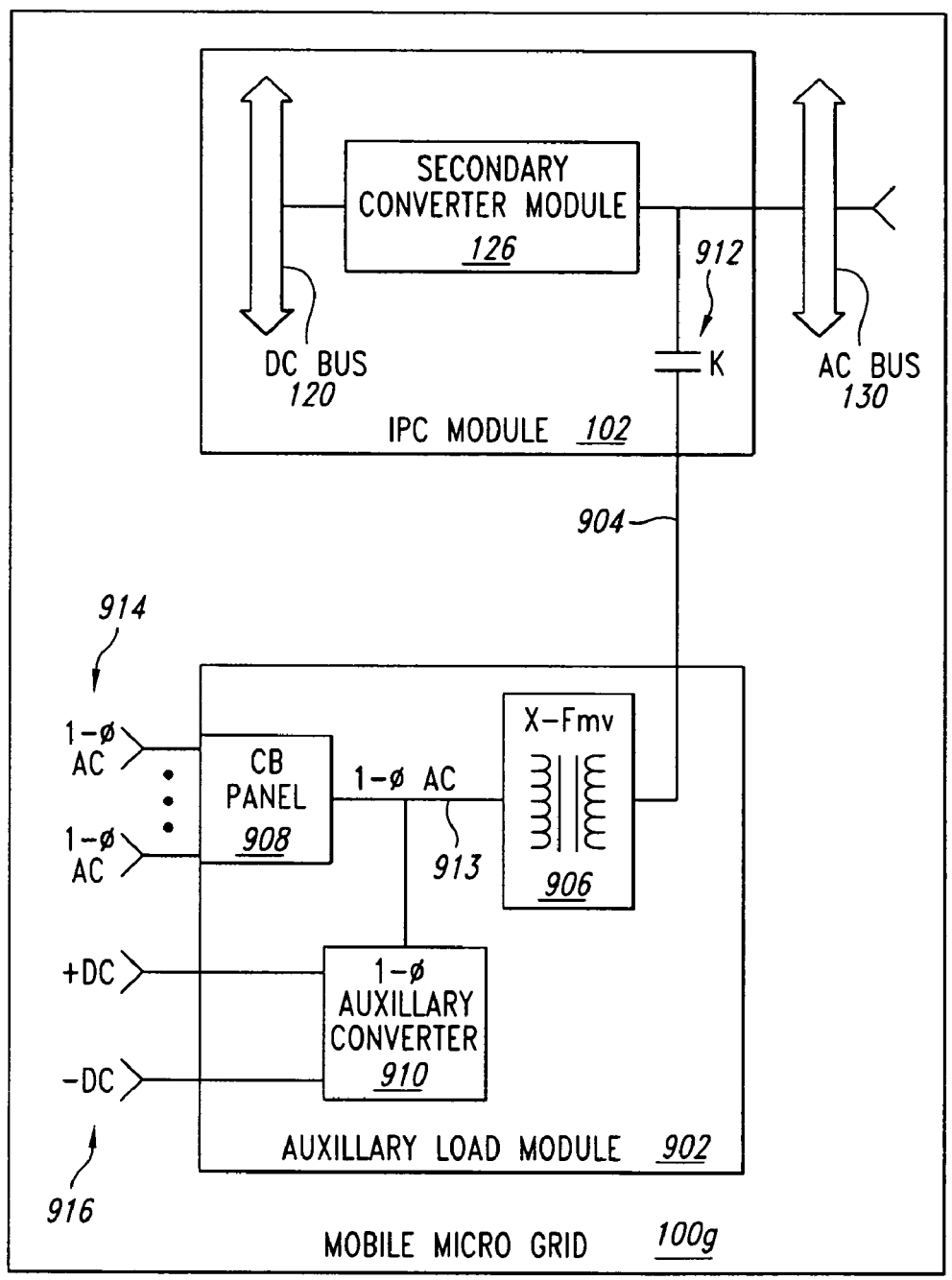
FIG. 9 is a block diagram of an embodiment of the mobile micro grid comprising an auxiliary load module.

In some embodiments, in order to protect the various power sources and power loads, and in order to increase the safety of the systems, the power sources and the power loads should be electrically isolated from each other. In some embodiments, the DC bus 120 is electrically isolated from the power loads (such as the AC power system 218) by the secondary converter module 126. The secondary converter module 126 may achieve this electrical isolation by employing isolated DC/AC converters, transformers, a combination of these, or other suitable electrical isolation means. An example of using a transformer to electrically isolate the DC bus 120 from the AC power system 218 is shown in FIG. 9 below. Placing electrical isolation between the DC bus 120 and the AC bus 130 allows a plurality of IPC modules 102 to be safely coupled to a common AC bus 130 or to a common AC power system 218 (as can be seen in FIG. 4).

In embodiments where the DC bus 120 is electrically isolated from the AC power system 218, power from a power source may be directly transferred to the DC bus 120 without electrical isolation.

For example, referring to FIG. 6, AC power may be transferred through the AC primary converter module 104a from a power source coupled to connectors 136a, to the DC bus 120. This power is transferred through the diode rectifier 602. As shown in FIG. 6, the diode rectifier 602 may be a non-isolating type of AC/DC converter. This configuration may reduce overall system cost, weight, and complexity. A power source coupled to the connectors 136a would still be electrically isolated from an AC bus 130 or an AC power system 218, as the DC bus 120 would be electrically isolated from these components.

In order to preserve electrical isolation between each power source however, electrical isolation would have to be introduced between any other power sources coupled to the DC bus 120 and the DC bus 120. In one embodiment, the first DC primary converter module 106a and the second DC primary converter module 106b include isolated DC/DC converters 612a, 612b. These isolated converters 612a, 612b provide electrical isolation between any power sources coupled to connectors 138a, 138b and the DC bus 120. Therefore, in the exemplary embodiment shown in FIG. 6, power sources coupled to connectors 136a, 138a, and 138b, would be electrically isolated from each other. Further, electrical isolation would exist between the DC bus 120 and the AC power system 218 (as described above), and therefore each power source in this exemplary embodiment would be electrically isolated from each other power source, and all power sources would be electrically isolated from the AC power system 218.

Referring to FIG. 7, the second AC primary converter module 104b, and the DC primary converter module 106, share a common isolated DC/DC converter 702b. In this exemplary embodiment, in order to maintain electrical isolation between each power source and the power system, only one of these two primary converter modules 104b, 106 would be operable to transfer power at any one time.

For example, referring to FIG. 7, AC power may be transferred through the AC primary converter module 104a from a power source coupled to connectors 136a, to the DC bus 120. As for the example described in relation to FIG. 6 above, this power is transferred through the diode rectifier 602, which may be a non-isolating type of power converter. A power source coupled to the connectors 136a would however still be electrically isolated from an AC bus 130 or an AC power system 218, as the DC bus 120 would be electrically isolated from these components (as described above).

In order to preserve electrical isolation between each power source however, electrical isolation would have to be introduced between any other power sources coupled to the DC bus 120 and the DC bus 120.

The second AC primary converter module 104a is operable to transfer power from a power source coupled to connectors 136b to the DC bus 120. The DC primary converter module 106 is operable to transfer power from a power source coupled to connectors 138 to the DC bus 120. However, in this embodiment, as both the second AC primary converter module 104b, and the DC primary converter module 106 share the same isolated DC/DC converter 702b to transfer power from the connectors 136b, 138 to the DC bus 120; only one of these primary converter modules 104b, 106 can transfer power at any one time.

Accordingly, the remaining primary converter modules 104b, 106 is locked out or otherwise disabled so that that primary converter module is not used.

A variety of suitable methods that may be used to lock out or disable a particular primary converter module have already been described above, and will not be repeated for the sake of brevity.

Electrical isolation of the DC bus 120 also enables the connection of multiple grounded power sources to an IPC module 102, and prevents circulating power among power sources input to different IPC modules 102.

An IPC module 102 may also set different priorities for power usage for different power sources coupled to the IPC module 102. For example, for a variety of reasons it may be desirable to draw a specific amount of power from selected power sources. It may also be desirable to draw specific portions of the power required by a power system 218 from selected power sources. Or, it may be desirable to draw a first portion of a power change from a selected power source.

For example, under low light conditions it might be desirable to draw less power from a photovoltaic power source than from other power sources connected to an IPC module 102. As another example, if fuel for a particular power source is running low, it might be desirable to draw less power from that particular power source. As another example, if a power source operates most efficiently at a particular power level it might be desirable to draw power from that power source to keep it running in its most efficient state. These, and many other situations may make it desirable to set priorities for power usage from particular loads, and to control the amount of power drawn from each power source to meet the needs of the power system 218.

The amount of power drawn from power sources coupled to an IPC module 102 may be controlled by controlling the power transfer through the primary converter module coupled to that power source. For example, referring to FIG. 6, a power flow limit and/or a current limit may be set for current flowing out of the isolated DC/DC converter 612a in the first DC primary converter module 106a. The combination of this set current limit and/or the voltage level of the DC bus 120 sets the maximum amount of power that may be transferred by the first DC primary converter module 106a. Similarly, the maximum amount of power that may be transferred through the second DC primary converter module 106b may be set by setting the maximum current limit of the isolated DC/DC converter 612b. Therefore more or less power may be transferred from power sources coupled to the connectors 138a, 138b depending on the current limits set for the isolated DC/DC converters 612a, 612b. Higher current limits for a given DC bus voltage therefore mean that more power may be transferred through a particular primary converter module.

The power flow and/or current limits may be set by any suitable controller such as the processors 504 (FIG. 5) or the controller 206 (FIG. 2). Suitable priorities may be assigned to particular power systems based on a variety of factors. Suitable priorities may be pre-programmed in the controller. Priorities may be based on various measurements, such as light intensity measurements, fuel level measurements, or other suitable measurements. Priorities may be entered into the system by an operator, or may depend on communications and signals received from power sources, or may be set by any other suitable method. A person skilled in the art will appreciate that there are a multitude of priorities, and sources for priorities that may be used.

Similarly, priorities may be assigned to IPC modules coupled to form a micro grid (such as the mobile micro grid 100b shown in FIG. 4). Individual IPC modules may be assigned priorities to specify what portion of the total power transferred to a power system is provided by each individual IPC module. As an illustrative example, a controller may be operable to prioritize a first primary converter module 104, 106 with respect to a second primary converter module 104, 106 In the same or different IPC modules 102) such that a change in the AC power that is transferred to the power system 219 is allocated to the first primary converter module. Thus, the power change is accommodated by receiving more power from the external power source coupled to the prioritized primary converter module 106. If the capacity of the prioritized primary converter module 106 is reached when power changes are accommodated, then additional power may be received from other power sources and transferred through their respective primary converter modules 104, 106.

In some embodiments, prioritization may be implemented by using percentages, where a percentage of the power change is allocated to a first primary converter module 104, 106 and another percentage of the power change is allocated to one or more other primary converter modules 104, 106. For example, but not limited to, the controller 206 may be operable to allocate a first percentage of power change for the first primary converter module and allocate a second percentage of power change to the second primary converter module. In response to a change in the AC power that is transferred to the power system 218, the controller 206 adjusts power flow through the first primary converter module by the first percentage of the power change and adjusts power flow through the second primary converter module by the second percentage of the power change.

In some embodiments, IPC module priorities are set by controlling the DC Bus voltage level of individual IPC modules. IPC modules with higher DC bus voltage levels will transfer more power to the AC bus then IPC modules with lower DC bus voltage levels, and thus have a higher priority. IPC module priorities may also be set by controlling the current limits of power transferred from the DC bus to the AC bus by the secondary converter modules. Higher current limits at a specific output voltage result in a higher maximum power that may be transferred through that IPC module.

Suitable IPC module priorities, DC bus voltage levels, and current limits may be set by any suitable controller such as the controller 206 (FIG. 2). As described above, there are a multitude of factors that may be used to set appropriate priorities among IPC modules.

Figure 8:
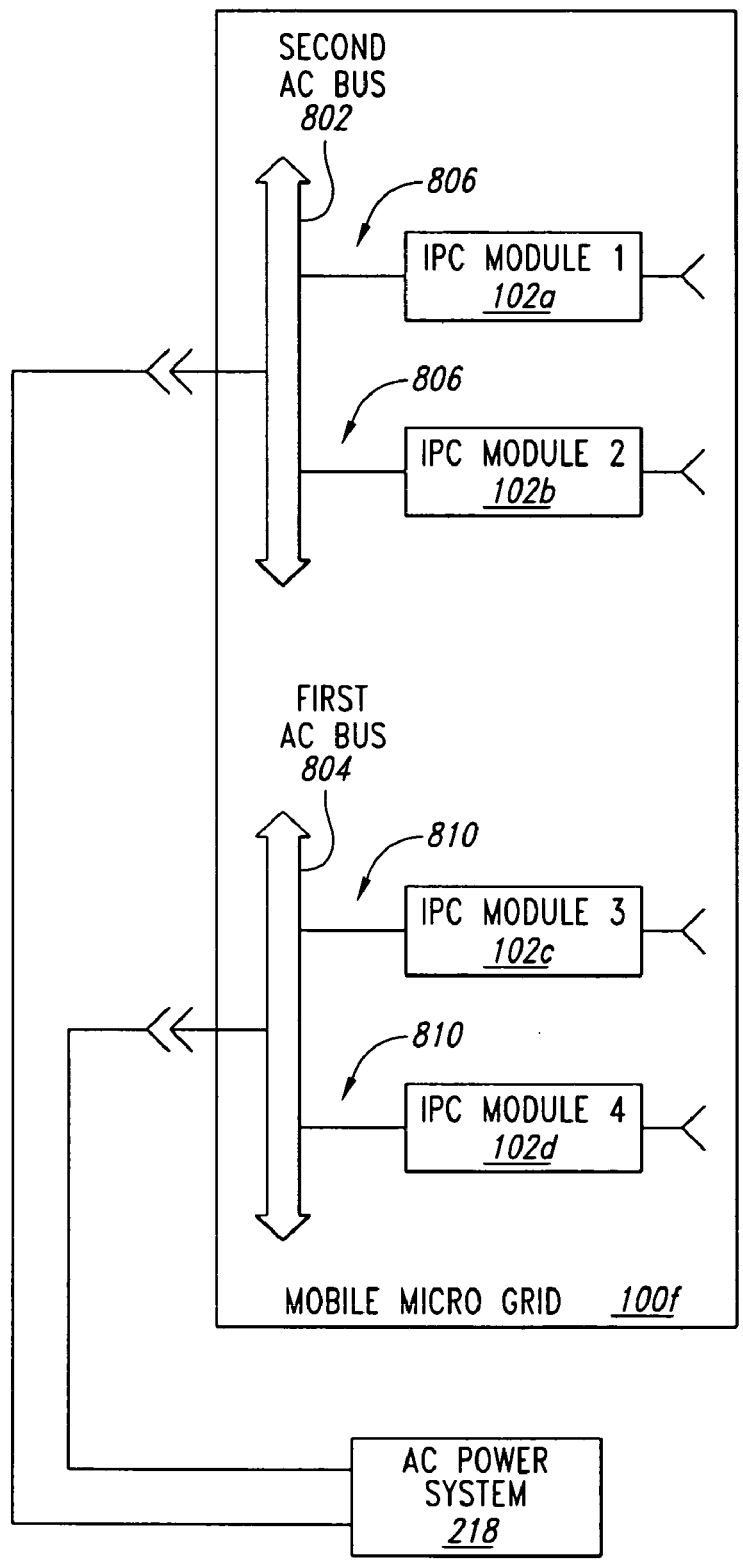
FIG. 8 is a block diagram of a mobile micro grid comprising a first AC bus and a second AC bus.

FIG. 8 is a block diagram of a mobile micro grid 100f comprising a first AC bus 802 and a second AC bus 804. For convenience of illustration, the mobile micro grid 100f further comprises IPC modules 102a-102d, previously described above (FIG. 4). The first IPC module 102a and the second IPC module 102b are electrically coupled to the first AC bus 802, via connections 806. Similarly, the third IPC module 102c and the fourth IPC module 102d are electrically coupled to the second AC bus 804, via connections 808. Accordingly, the first IPC module 102a and the second IPC module 102b are operating in parallel, and the third IPC module 102c and the fourth IPC module 102d are operating in parallel.

In some situations, it may be desirable to provide contingency reliability for events occurring on the AC system side of the secondary converter module 126 (FIGS. 1-3). This exemplary embodiment provides a single contingency capacity rating (for a contingency on one of the AC busses 802, 804) equal to the steady-state capacity rating of two of the IPC modules 102a-102d.

Assuming that there is a contingency event on one of the AC buses 802 or 804, the remaining AC bus is operational such that the two IPC modules 102 to which it is coupled remain operational. Further assuming that the steady-state capacity ratings of the IPC modules 102a-102d are equal, this exemplary embodiment provides for a single contingency capacity rating equal to 50% of the mobile micro grid 100f steady-state capacity for a contingency on either the first AC bus 802 or the second AC bus 804. That is, after the contingency event, two of the IPC modules 102 remain operational to transfer power through the mobile micro grid 100f.

This exemplary embodiment further provides a 75% single contingency capacity for a single contingency event occurring in one of the IPC modules 102. For example, if a transformer in one of the transformation systems 224 (FIG. 2) fails, protective equipment may operate to isolate the failed transformer. In an embodiment having four IPC modules 102, the other three IPC modules 102 remain operational after the single contingency event. Assuming that the steady-state capacity ratings of the four IPC modules 102 are equal, this embodiment provides for a single contingency capacity rating equal to 75% of the mobile micro grid 100f steady-state capacity rating for the above-described single contingency event since three of the four IPC modules 102 remain operational.

It is appreciated that in the event that the steady-state capacity ratings of the four IPC modules 102 are different, or if there are more than four, or less that four, IPC modules 102, the single contingency capacity rating will be different from the above-described 50% and 75% contingency ratings. For example, in an embodiment having five IPC modules 102, the above described single contingency in a transformer in one of the transformation systems 224 (FIG. 2), the four remaining operational IPC modules will provide for a single contingency capacity rating equal to 80% of the mobile micro grid 100f steady-state capacity rating (assuming that the steady-state capacity ratings of the five IPC modules 102 are equal).

In the various embodiments, operation of selected converters may be used to provide electrical isolation between components in response to the occurrence of a contingency, thereby providing the above-described contingency capacity ratings. Electrical isolation is provided by prohibiting operation of the converters that have failed, or that are electrically adjacent to the failed component. Operation may be prohibited by controlling the gating signals communicated to the semiconductor devices of the power converters 222.

For example, in the above-described IPC module 102 having the failed transformer, the corresponding power converter 222 in the secondary converter module 126 (FIGS. 1-2) may be controlled by the controller 206 to prohibit operation, thereby electrically isolating the failed transformer from the other operating components in the mobile micro grid 100. Alternatively, or additionally, the corresponding power converters 112, 114, 240 in the respective primary converter modules 104, 106, 202 may be controlled by the controller 206 to prohibit operation. (It is noted that in this example, the respective PCB 310 illustrated in FIG. 3 will likely independently operate to isolate the AC power system 218 from the failed transformer.)

As another example, upon occurrence of a contingency at a power source 108, 110 (FIG. 1), the IPC module 102 may be electrically isolated from the failed power source by prohibiting operation of the corresponding power converters 112, 114, 240 in the respective primary converter module 104, 106, 202. Alternatively, or additionally, operation may be prohibited in the corresponding power converter 222 in the secondary converter module 126. Furthermore, when a plurality of power sources are transferring power through the mobile micro grid 100, the failed power source is electrically isolated from the other power sources and the AC power system 218.

FIG. 9 is a block diagram of an embodiment of the mobile micro grid 100g comprising an auxiliary load module 902. Auxiliary load module 902 is coupled to the AC side of a secondary converter module 126, via connection 904. Auxiliary load module 902 comprises a transformer 906 (Xfmr), a circuit breaker (CB) panel 908, and an optional single phase (1ø) auxiliary converter 910. The auxiliary load module 902 provides a conveniently accessible source of auxiliary power on the mobile micro grid 100g that may be used to source a variety of external auxiliary loads (not shown).

When controller 206 (FIG. 2) actuates an optional switch 912, AC power is transferred through the transformer 906 to either the CB panel 908 or the 1ø auxiliary converter 910, via connection 913. CB panel 908 is operable to provide AC power, typically at 120 volts (v) AC or 240v AC, to external auxiliary loads coupled to the CB panel 908 via connectors 914. In one embodiment, CB panel 908 may be similar to a circuit breaker panel found in a residence or the like. Connectors 914 may be standardized plug connectors or other suitable connectors. In some embodiments, a variety of connectors 914 may be provided that are standardized according to plug types used in different geographical regions. Power may be provided at 120 volts or 240 volts AC. Further, other AC voltages may be available, depending upon the secondary voltage side of the transformer 906.

If external auxiliary loads require DC power, the DC auxiliary loads may be coupled to the auxiliary load module 902 via connectors 916. DC power is provided by the 1ø auxiliary converter 910 which receives AC power on connection 913 and converts the received power into DC power. One or more standardized DC connectors may be provided. In some embodiments, a variety of connectors 916 may be provided that are standardized according to plug types used in different geographical regions.

Figure 10:
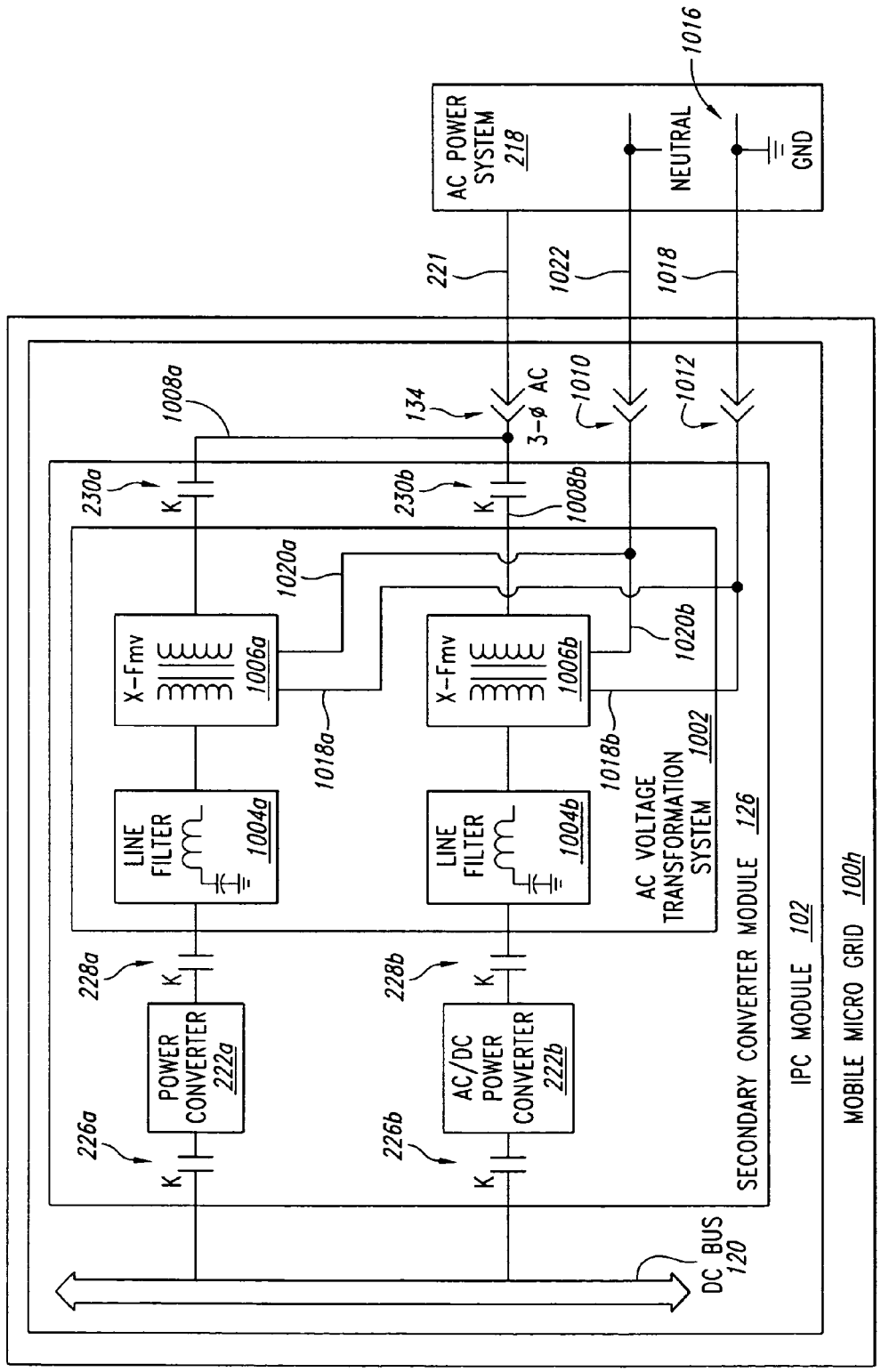
FIG. 10 is a block diagram of a mobile micro grid comprising an AC voltage transformation system having optional line filters and transformers.

FIG. 10 is a block diagram of a mobile micro grid 100h comprising an AC voltage transformation system 1002 having optional line filters 1004a, 1004b and transformers 1006a, 1006b. Line filter 1004a is electrically coupled between the first power converter 222a and the first transformer 1006a. Similarly, the second line filter 1004b is coupled between the second power converter 222b and the second transformer 1006b. The optional line filters 1004a, 1004b provide power conditioning of the AC power received from the first and second power converters 222a, 222b, respectively.

In the exemplary mobile micro grid 100h, AC power output from the first transformer 1006a and the second transformer 1006b is transferred to connector 134, via connections 1008a and 1008b, respectively. The AC power is then transferred from the mobile micro grid 100h to the AC power system 218 via connector 221.

Further illustrated are a neutral connector 1010 and a ground connector 1012. The ground connector 1012 is coupled to connector 1014, which is grounded within the AC power system 218 using a suitable grounding device 1016, such as a grounding mat or the like. The transformers 1006a, 1006b have a grounding terminal (not shown) that is coupled to connections 1018a, 1018b, respectively. When connector 1012 is coupled to connector 1014, the AC power system and the transformers 1006a, 1006b are commonly grounded. In other embodiments, an optional grounding device (not shown) may be included in the mobile micro grid 100h to provide further grounding.

Some transformers 1006a and/or 1006b have neutral terminals (not shown). The transformer neutral terminals are coupled to neutral connector 1010, via connections 1020a, 1020b, respectively. The connector 1022 corresponds to a neutral voltage connection of the AC power system 218. When neutral connector 1010 is coupled to connector 1022, the AC power system and the transformers 1006a, 1006b have a common neutral voltage.

As noted above, the IPC modules 102 are independently grounded to their respective power sources. Since the transformers 1006a, 1006b are independently grounded to the AC power system 218, the ground connections of the IPC modules 102 and their respective power sources are electrically isolated from AC power system ground 1016 or the neutral voltage.

In the above-described embodiments of the mobile micro grid 100-100h (FIGS. 1-10), various controllable switch devices are generally denoted with the label "K" for convenience. These controllable switch devices are coupled to controller 206 via connections 214. Logic 212 may be executed by processor system 208 to control the various switches "K" depending upon how the various components in the mobile micro grid 100 are being operated. Several non-limiting examples are provided hereinbelow.

With reference to FIG. 2, controllable switch device 116 is disposed between connector 136 and the AC/DC converter 112. Similarly, controllable switch device 118 is disposed between connector 138 and the DC/DC converter 114, and controllable switch device 248 is disposed between connector 242 and the converter 240.

As noted above, in selected embodiments, only one power source may transfer power through an IPC module 102. Accordingly, one of the connectors 136, 138, or 242 will be used to physically and electrically couple the IPC module 102 to the single power source via the selected primary converter, depending upon the nature of the power source.

For example, if the power source generates AC power, the power source would be physically and electrically coupled to the AC primary converter 104 using connector 136. Once the AC power source is coupled to the AC primary converter 104 via connector 136, the controllable switch devices 118 and 248 will be actuated, operated or maintained in an open state so that power can not be transferred through the primary converter modules 106 and 202, respectively. That is, in such selected embodiments, the IPC module 102 has "locked out" the unused primary converter modules 106 and 202 so that they cannot be electrically coupled to another power source.

In some embodiments, electrical parameters indicative of power transfer from a power source are detected to determine which of the primary converter modules 104, 106 or 202 are coupled to a power source. Accordingly, a sensor system 314 (FIG. 3) communicates with a plurality of sensors (not shown) residing in each of the primary converter modules 104, 106 or 202. In response to the detection of a power transfer through the AC primary converter 104, for example, controller 206 will communicate signals to open controllable switch devices 118 and 248 (if they are in a closed position). In some embodiments, the above-described signals are maintained as long as the power source is transferring power through the AC primary converter module 104. Accordingly, in such selected embodiments, the primary converter modules 106 or 202 are "locked out" and are inoperable.

In another embodiment, the above-described controllable switch devices may be omitted or used for other purposes. Here, in response to the detection of a power transfer through the AC/DC converter 112, for example, controller 206 will determine that the converters 114 and 240 (of the primary converter modules 106 or 202, respectively) are not to become operational, and accordingly, will not transmit gating signals to the power semiconductor devices (not shown) residing in those converters so that they are "locked out" and remain in an inoperable state.

In yet another embodiment, physical mechanisms associated with the connectors 136, 138 and 242 are operable to accept physical coupling to only one of the connectors 136, 138 and 242. In the above-described example where an AC power source is coupled to connector 136, the physical mechanism (not shown) will prevent physical access to unused connectors 138 and 242. Accordingly, in such selected embodiments, the converters 114 and 240 are physically "locked out" and remain in an inoperable state.

In other embodiments, other controllable switch devices may be operated to "lock out" or otherwise disable unused primary converter modules. It is appreciated that such "lock out" schemes are too numerous to be described herein. All such embodiments are intended to be included within the scope of this disclosure.

In these various embodiments, only one primary converter of an IPC module 102 is operable to transfer power from a power source. As used herein, the phrases "lock out" and/or "locked out" generally denotes the state of the unused primary converters when in an inoperable state. The inoperable state may be realized in a variety of manners, as described above. All such embodiments are intended to be included within the scope of this disclosure.

The controllable switch devices "K" may be implemented using any convenient device. For example, circuit breaker devices, contactors, and/or replays may be used. Controllable no-load switch devices may be used. Solid state circuitry may be used. It is appreciated that such controllable switch devices "K" are too numerous to be described herein and that all such embodiments are intended to be included within the scope of this disclosure.

As noted above, the controllable switch devices are communicatively coupled to controller 206 via connections 214. Similarly, the various converters are communicatively coupled to controller 206 via connections 216. For convenience, connections 214 and 216 are illustrated as a single connection. Other embodiments may employ individual connections from controller 206 to the various controllable switch devices and/or controllers, or may employ a common communication bus accessible to controller 206, the various controllable switch devices and/or controllers. It is appreciated that the possible apparatus and process to communicatively couple the controller 206 to the various controllable switch devices and/or controllers are too numerous to be described herein. All such embodiments are intended to be included within the scope of this disclosure.

Exemplary DC/DC converters and AC/AC converters are described in commonly copending application "Power System Method Apparatus" having Ser. No. 60/621,012, filed on Oct. 20, 2004. Such converters, and other types of converters, may be used in the various embodiments of the mobile micro grid 100.

Figure 11:
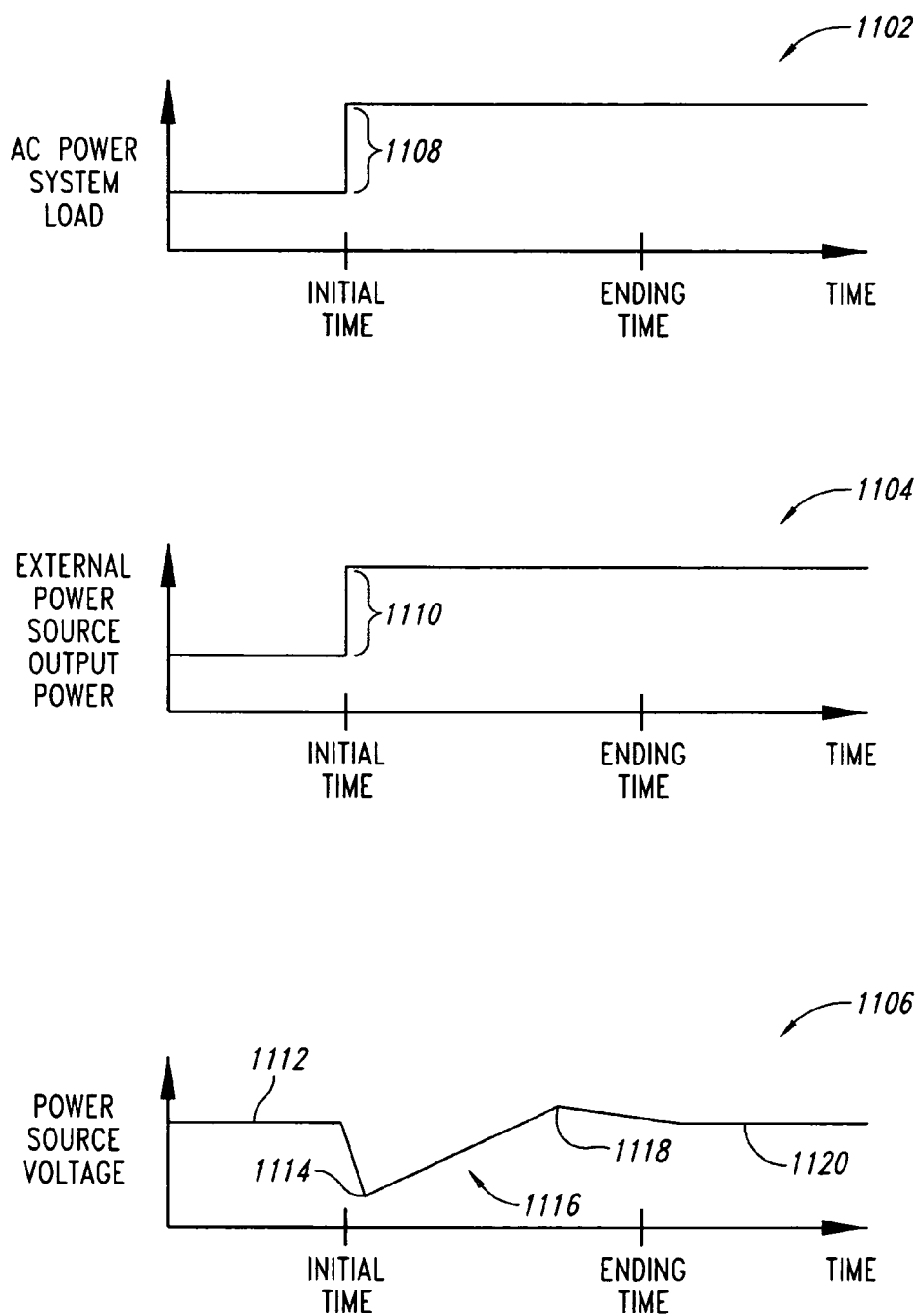
FIGS. 11 and 12 are graphs illustrating the impact of a load change seen by a power source that is transferring power through embodiments of a mobile micro grid to loads of the AC power system.
Figure 12:
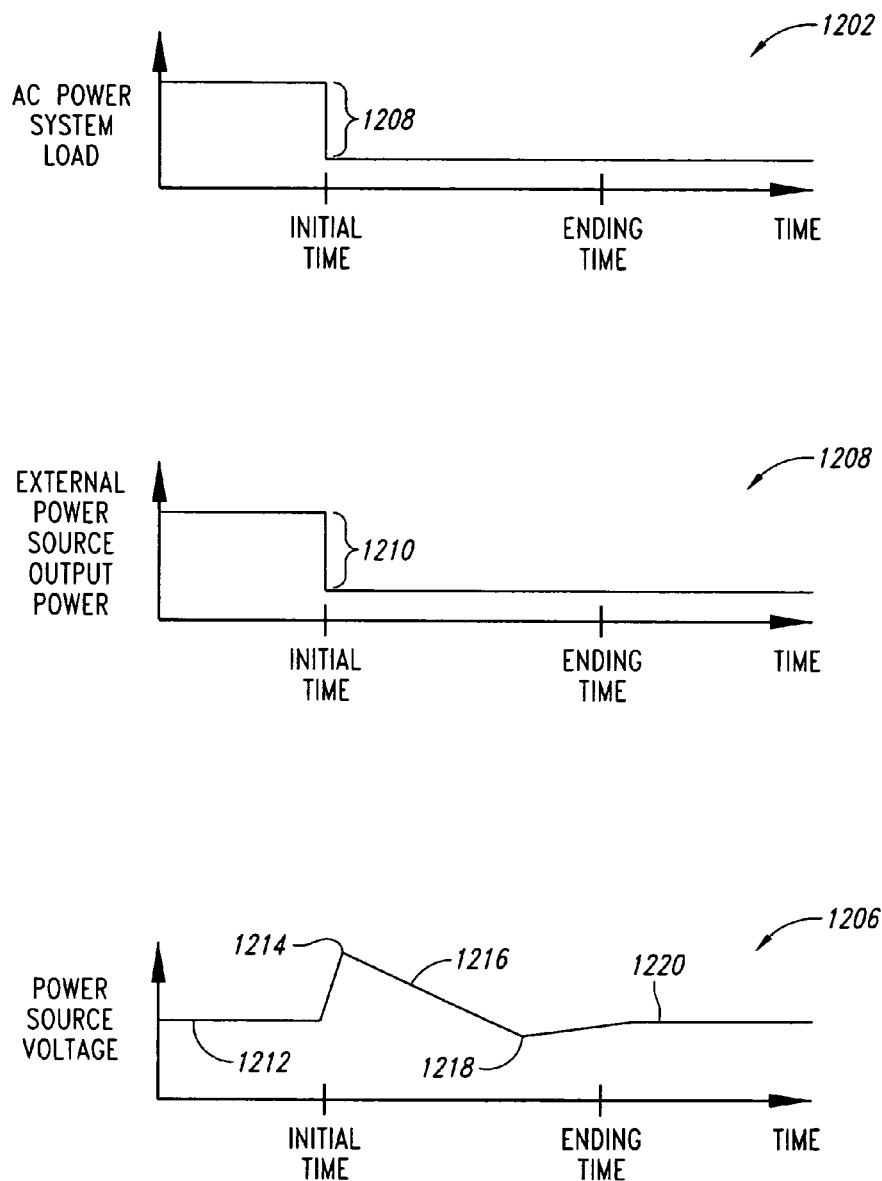

FIGS. 11 and 12 are graphs illustrating the impact of an abrupt load change seen by a power source that is transferring power through embodiments of a mobile micro grid 100 (FIGS. 1-10) to loads of the AC power system 218 (FIGS. 2-4). Abrupt load changes referred to herein are not transient load fluctuations. Transients are typically temporary in nature and last for only a brief period of time. An abrupt load change referred to herein is a load change that abruptly occurs and that is a change to the steady state load delivered to the AP power system 218 (FIG. 2-4). Further, the abrupt load change may be caused by a change in one or more customer loads, and/or in a change in generation of a remote power source.

FIGS. 11 and 12 illustrate the impact of the abrupt load change that starts at the initial time, and how the embodiments respond through the ending time. The period of time between the initial time and the ending time may be referred to as a power transfer period since various power transfers will be changed, as described in greater detail below.

It is appreciated that in all electrical systems, at any instant, the amount of power consumed equals the amount of power generated. As noted above, in a strong electric system, relatively small abrupt changes in load and/or generation do not significantly impact operation of the electric system since a relatively small abrupt change in load and/or a relatively small abrupt change in generation corresponds to a relatively small percentage of total system load. However, in a weak electric system, such relatively small abrupt changes in load and/or generation will significantly impact operation of the electric system since a relatively small abrupt change in load and/or generation corresponds to a relatively large percentage of total system load.

Furthermore, it is appreciated that due to the unpredictable nature of power system losses, various sources of metering and control errors, and other time-varying phenomena associated with electric power systems, determining an exact amount of an abrupt load change is, at a practical level, very difficult to accomplish. Estimations of abrupt load changes may be reasonably accurate so as to allow the various embodiments to respond to a sensed or detected abrupt load change. For convenience, the term "equal" as used herein is understood not to be a precise equality, but rather, a reasonable approximation of equableness.

A relatively small abrupt change in load may arise when a load starts up, such as starting a motor to perform some type of task. Load changes also occur when a load is disconnected from the AC power system 218 (FIGS. 2-4). A relatively small abrupt change in generation may occur if a power source suddenly adjusts its power output, such as when a generator is shut down during a contingency event. For convenience, such relatively small abrupt change in load and/or generation fluctuations are interchangeably referred to herein as an abrupt load change.

With respect to FIG. 11, graphs 1102, 1104 and 1106 generally illustrate the impact of an abrupt load increase. To illustrate, assume that an incremental load increase 1108 occurs at some point in time, referred to hereinafter as the initial time. Graph 1102 indicates that the load abruptly increases from a first value to a second, higher value. Assuming that only one external power source is coupled to the AC power system 218 (FIG. 2), graph 1104 indicates a corresponding abrupt power output increase 1110 at the initial time. That is, the power output from the external power source abruptly increases from a first value to a second, higher value. The magnitude of the power output increase 1110 corresponds to the magnitude of the abrupt load increase 1108. The external power source corresponds to one of the above-described AC power source 108 or DC power source 110 (FIG. 1).

Assuming that the external power source does not have a fast acting excitation system, voltage at the external power source would decrease from an initial voltage value 1112 to a depressed voltage value 1114 just after the initial time. As the external power source responds to the abrupt increase in power supplied to the load, voltage at the external power source would gradually increase, as illustrated by the graph portion 1116. It is likely that there will be some level of voltage overshoot 1118. At some point in time, referred to hereinafter as the ending time, the voltage will settle out to a final voltage value 1120. The initial voltage value 1112 and the final voltage value 1120 are typically substantially similar in magnitude. (Some types of external power sources, such as rotation machines, have excitation systems that rapidly adjust volt-amps-reactive, or VAR, output to maintain terminal voltage of the external power source. Accordingly, graph 1106 would not be applicable.)

With respect to FIG. 12, graphs 1202, 1204, and 1206 generally illustrate the impact of an abrupt load decrease. To illustrate, assume that an incremental abrupt load decrease 1208 occurs at some point in time, again referred to as the initial time. Graph 1202 indicates that the load abruptly decreases from a first value to a second, lower value. Assuming that only one external power source is coupled to the AC power system 218 (FIG. 2), graph 1204 indicates a corresponding abrupt power output decrease 1210 from the external power source. The magnitude of the power output decrease 1210 corresponds to the magnitude of the abrupt load decrease 1208.

Again, assuming that the external power source does not have a fast acting excitation system, the voltage at the external power source would increase from an initial voltage value 1212 to a high voltage value 1214 just after the initial time. As the external power source responds to the abrupt increase in power supplied to the load, voltage at the external power source would gradually increase, as illustrated by the graph portion 1216. It is likely that there will be some level of voltage undershoot 1218. At the ending time, the voltage will settle out to a final voltage value 1220. Similar to the above-described abrupt load increase example, the initial voltage value 1212 and the final voltage value 1220 are typically substantially similar in magnitude.

In a more realistic operating scenario, which parallels the above-described abrupt load changes of FIGS. 11 and 12, it would be reasonable to expect that a plurality of external power sources would be serving the loads of a relatively weak AC power system 218, via embodiments of one or more mobile micro grids 100. Accordingly, for a given abrupt load increase 1108 (FIG. 11) or abrupt load decrease 1208 (FIG. 12), magnitude of the power output increase 1110 or power output decrease 1210 experienced by each power source would be a portion of the total abrupt load change 1108, 1208. The power output increase 1110 or power output decrease 1210 would be apportioned among the plurality of individual external power sources. In one embodiment, the apportionment would be determined and controlled by controller 206.

A variety of control strategies may be devised and incorporated into logic 212 (FIG. 2) for apportioning power changes among a plurality of external power sources. In one situation, the apportioned power output increase 1110 or decrease 1210 for each external power source could be based upon the relative size of each external power source. (For example, in a system with a 10 Kw external power source and a 1 Kw external power source, the relatively larger external power source could be apportioned 90% of the abrupt load change while the smaller external power source would be apportioned the remaining 10%.) Or, the power output increase 1110 or power output decrease 1210 for each external power source may be based on the external power source's ability to respond to abrupt load changes. (For example, in a system with a fast acting gas turbine power source and a slow acting fuel cell system, the gas turbine power source could be apportioned 90% of the abrupt load change while the slower fuel cell may be apportioned the remaining 10%.) It is appreciated that the variety of control strategies used to apportion power output changes among a plurality of external power sources are too numerous to be conveniently describe herein. However, all such control strategies are intended to be within the scope of this disclosure.

Since embodiments of the mobile micro grid 100 have a common controller 206, the logic 212 may be devised to apportion an abrupt power output increase 1110 or decrease 1210 for each external power source. Actual power output increases or decrease are controllable in that the controller 206 controls the converters in each IPC module 102. Furthermore, in a system employing two or more mobile micro grids 100, the controllers 206 of the mobile micro grids 100 may be communicatively coupled together to further coordinate the apportionment a power output increase 1110 or decrease 1210 for each of the external power sources.

As an illustrative example, FIG. 4 illustrates an external AC power source 108a, an external first DC power source 110a and an external second DC power source 110b providing power to loads of the AC power system 218. In this exemplary hypothetical example, assume that it is predetermined that the AC power source 108a is to be apportioned 50% of an abrupt power change, and that the DC power sources 110a and 110b are to each be apportioned 25% of an abrupt power change. In one embodiment, controller 206 communicates control signals to the AC/DC converters 112 (FIG. 2) to change the power transfer through the two IPC modules 102a and 102c coupled to the AC power source 108a. That is, each IPC module 102a and 102c could be operated to equally share (or unequally share, if so desired) the 50% abrupt load change apportioned to the AC power source 108a. Controller 206 would further communicate control signals to the DC/DC converters 114 to change the power transfer through the two IPC modules 102b and 102d so that each DC power source 110a and 110b provides 25% of the abrupt load change. The above-described simplified hypothetical example illustrates a significant benefit of a mobile micro grid 100 in that power sources may be isolated from various types of abrupt changes occurring on the AC power system 218.

Furthermore, since the voltage of the external power source (either AC or DC, depending upon the type of power source) is converted to the DC voltage of the DC bus 120, and since the DC voltage of the DC bus 120 is then converted to an AC voltage, voltage of the power source may be electrically isolated from voltage changes occurring on the AC power system 218. For example, a lightning strike on the AC power system 218 may cause a temporary voltage collapse or an attendant voltage surge. The voltage collapse or voltage surge, upon reaching the mobile micro grid 100, will not be transferred through to the external power sources since the controller 206 is operable to control the converter voltages.

Similarly, since AC power received from an external AC power source is converted to DC power at the DC voltage of the DC bus 120, and since the DC voltage of the DC bus 120 is then converted to AC power at an AC frequency of the AC power system 218, operating frequency of the external power source may be electrically isolated from load frequency deviations occurring on the AC power system 218. For example, in an extreme situation, load frequency on the AC power system 218 may abruptly increase to a level that is undesirable for an AC rotating machine power source. If the rotational speed of the rotating components of the AC rotating machine, such as turbine blades in a steam or gas turbine, exceed design limits, the rotating component may be damaged or experience an undesirable loss of life. Rotational speed of the rotating components are directly related to the electrical operating frequency of the AC rotating machine power source. Angular instability may also be induced on an AC rotating machine by large frequency deviations. However, the load frequency deviation on the AC power system 218 will not be transferred through to the power sources since the controller 206 is operable to independently control frequency of AC power of the AC/DC converters 112.

Selected embodiments of a mobile micro grid 100 are operable to provide load-following capability for brief time periods to mitigate the impact of abrupt load changes on the external power sources, and accordingly, be referred to as a micro grid load-following system. Returning to FIG. 2, IPC module 102 includes the auxiliary DC power system 204. Upon detection of an abrupt load increase, controller 206 may be operable to transmit control signals to the DC/DC converter 232 to draw power from the auxiliary DC power storage device 234 for a brief period of time, thereby providing time for the external power source coupled to the IPC module 102 to respond to the required change in power output. Similarly, upon detection of an abrupt load decrease, controller 206 may be operable to transmit control signals to the DC/DC converter 232 to store power into the auxiliary DC power storage device 234 for a brief period of time.

In one exemplary embodiment, a control strategy is implemented in the logic 212 such that power is ramped from the amount of the abrupt load change apportioned to the power source at the initial time of the abrupt load change to zero by an ending time. Sensor system 314 detects the occurrence of the abrupt load change and communicates appropriate information to the controller 206, wherein the logic 212 of the control strategy is initiated. Controller 206 coordinates the apportionment of a power output increase or decrease for each of the external power sources, as noted above. However, with this embodiment, at the initial time of the abrupt load change, the apportioned power increase or decrease is initially accommodated by the auxiliary DC power storage device 234. Since the auxiliary DC power storage device 234 is a relatively small power source (in comparison to the power source coupled to the IPC module 102) with limited energy capacity, the time that the auxiliary DC power storage device 234 can accommodate a load change is limited.

Figure 13:
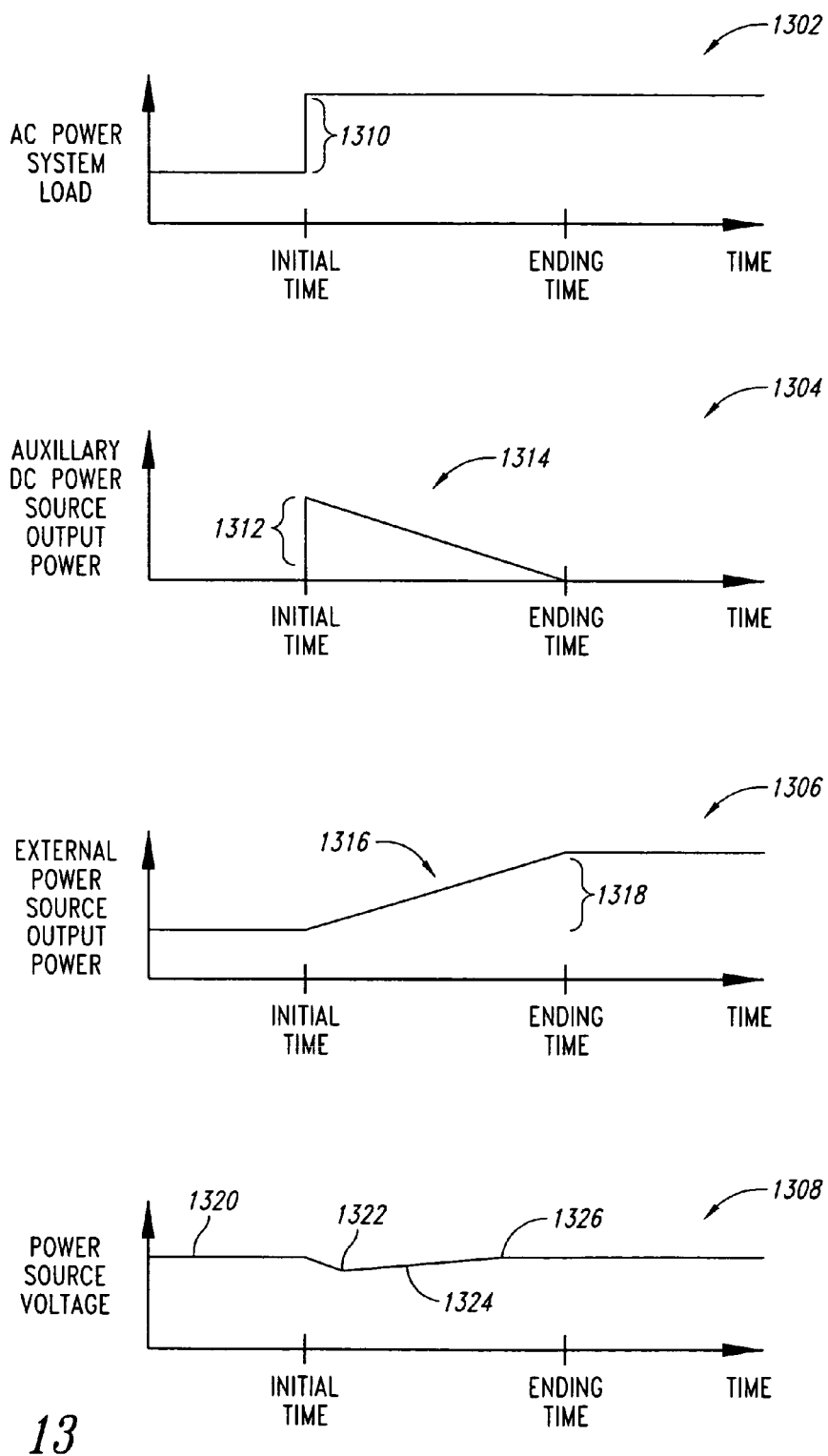
FIGS. 13 and 14 are graphs illustrating the impact of a load change seen by a power source and a DC power source that are transferring power through embodiments of a mobile micro grid to loads of the AC power system.
Figure 14:
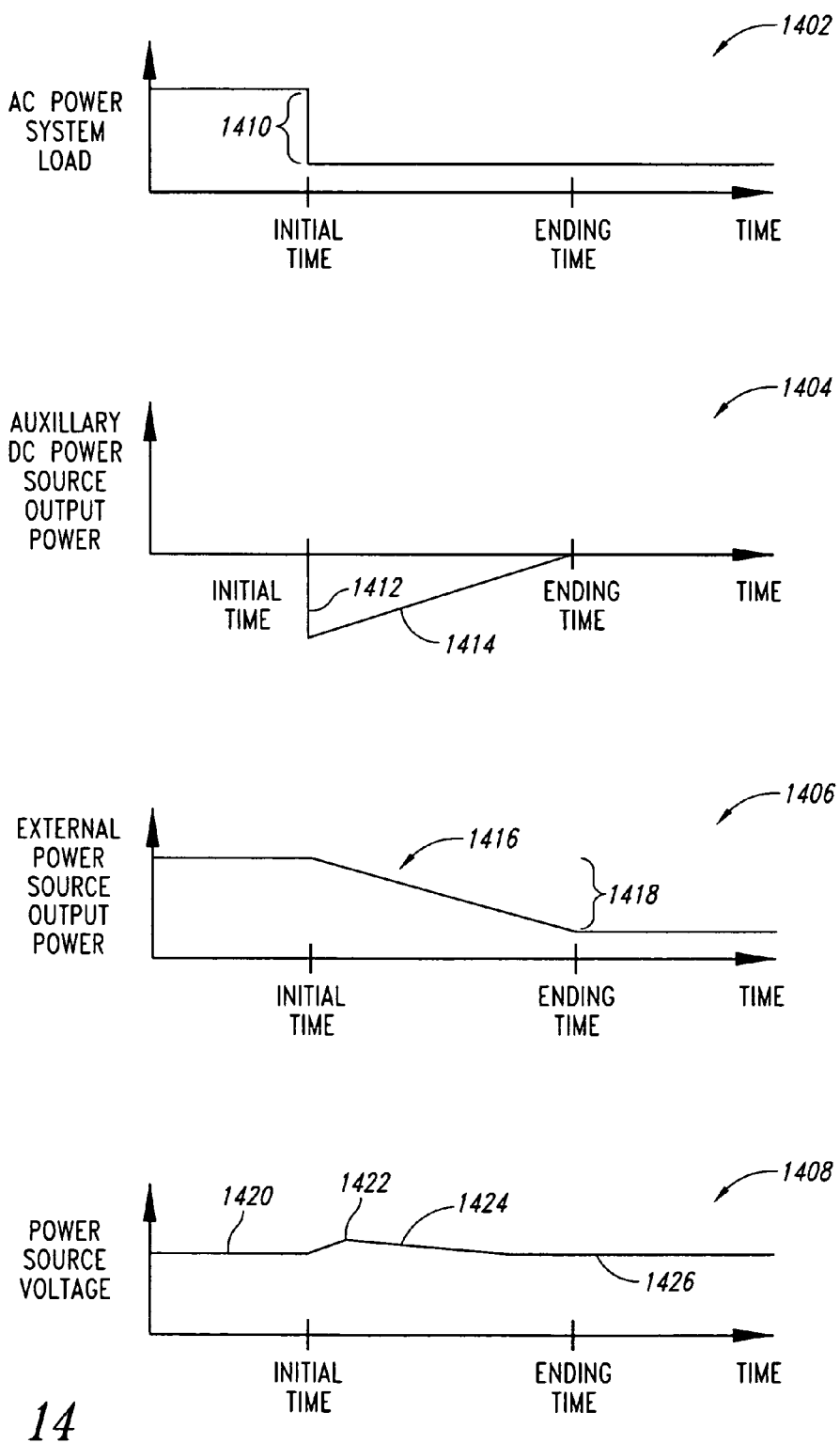

FIGS. 13 and 14 are graphs illustrating the impact of an abrupt load change seen by an external power source and an auxiliary DC power storage device 234 (FIG. 2) that are transferring power through embodiments of a mobile micro grid 100 (FIGS. 1-10) to loads of the AC power system 218 (FIGS. 2-4). The abrupt load change starts at the initial time. The period of time between the initial time and the ending time may be referred to as a power transfer period since various power transfers will be changed, as described in greater detail below. Here, the power transfer period corresponds to the amount of time that the auxiliary DC power storage device 234 is capable of outputting or storing power and/or energy.

FIG. 13 illustrates power transfer changes from the auxiliary DC power storage device 234 and the external power source coupled to the IPC module 102 in response to an abrupt load increase. FIG. 14 illustrates power transfer changes in response to an abrupt load decrease. FIGS. 13 and 14 illustrate the manner in which alternative embodiments, in response to an occurrence of an abrupt load change in the load system, may actuate the DC/DC converter 232 (FIG. 2) to supply a portion of the abrupt load change from the auxiliary DC power storage device 234 for a relatively brief period of time until power output from the external power source is adjusted. Accordingly, external power sources are protected from undesirable voltage and/or frequency deviations that would otherwise be caused by the abrupt load change.

With respect to FIG. 13, graphs 1302, 1304, 1306 and 1308 generally illustrate the impact of an abrupt load increase when the auxiliary DC power storage device 234 is used to accommodate the abrupt load change for a brief period of time. To illustrate, assume that an incremental load increase 1310 occurs at some point in time, again referred to as the initial time. Graph 1302 indicates the abrupt load increase at the initial time when the load increases from a first value to a second, higher value. Assuming for convenience that only one external power source is coupled to the AC power system 218 (FIG. 2), graph 1304 indicates a corresponding abrupt power output increase 1312 from the auxiliary DC power storage device 234. The magnitude of the power output increase 1312 corresponds to the magnitude of the load increase 1310. Because the auxiliary DC power storage device 234 is accommodating the initial power output increase, the output of the external power source coupled to the IPC module 102 does not change at the initial time, as illustrated by the graph 1306.

However, the auxiliary DC power storage device 234 has a limited energy capacity, and accordingly, is only able to provide a time-limited amount of energy to the AC power system 218. In one embodiment, the control strategy of logic 212 then begins to ramp down (decrease) the amount of power provided by the auxiliary DC power storage device 234, illustrated as a power ramp 1314, starting at the initial time and ending at the ending time. The control strategy of logic 212 also begins to ramp up (increase) the amount of power drawn from the external power source, illustrated as an inverse power ramp 1316, starting at the initial time and ending at the ending time. At the ending time, the power change 1318 of the external power source corresponds to the magnitude of the abrupt power increase 1310. Accordingly, at any given time, sum of the ramped transferred auxiliary DC power from the auxiliary DC power storage device 234 and the inversely ramped power from the external power source equals the magnitude of the abrupt load change 1410.

Assuming that the power source does not have a fast acting excitation system, the voltage at the power source would decrease from an initial voltage value 1320 to a low voltage value 1322 just after the initial time. However, since the abrupt load change is initially accommodated by the auxiliary DC power storage device 234, the magnitude of the low voltage value 1322 is less that the above-described depressed voltage value 1114 (FIG. 11). As the power source responds to the inverse ramped increase in power supplied to the load, voltage at the power source would gradually increase, as illustrated by the graph portion 1324. At the ending time, the voltage will settle out to a final voltage value 1326. The initial voltage value 1320 and the final voltage value 1326 are typically substantially similar in magnitude. It is likely that voltage overshoot will be minimal (as compared to the voltage overshoot 1118 illustrated in FIG. 11).

With respect to FIG. 14, graphs 1402, 1404, 1406 and 1408 generally illustrate the impact of an abrupt load decrease when the auxiliary DC power storage device 234 is used to accommodate the abrupt load change for a brief period of time. Similar to the abrupt load increase described above and illustrated in FIG. 13, assume that an incremental load decrease 1410 occurs at the initial time. Graph 1402 indicates the abrupt load decrease at the initial time when the load decreases from a first value to a second, lower value. Again assuming for convenience that only one external power source is coupled to the AC power system 218 (FIG. 2), graph 1404 indicates a corresponding amount of power 1412 stored into the auxiliary DC power storage device 234 at the initial time. The magnitude of the stored power 1412 corresponds to the magnitude of the load decrease 1410. Because the auxiliary DC power storage device 234 is accommodating the initial power output decrease, the output of the external power source coupled to the IPC module 102 does not change at the initial time, as illustrated by the graph 1406.

However, the auxiliary DC power storage device 234 has a limited energy storage capacity, and accordingly, is only able to store a limited amount of energy. In one embodiment, the control strategy of logic 212 then begins to ramp down (decrease) the amount of power stored by the auxiliary DC power storage device 234, illustrated as a power ramp 1414, starting at the initial time and ending at the ending time. The control strategy of logic 212 also begins to ramp down (decrease) the amount of power drawn from the external power source, illustrated as an inverse power ramp 1416, starting at the initial time and ending at the ending time. At the ending time, the power change 1418 of the external power source corresponds to the magnitude of the abrupt power decrease 1410. Accordingly, at any given time, sum of the ramped auxiliary DC power stored into the auxiliary DC power storage device 234 and the inversely ramped power from the external power source approximately equals the magnitude of the abrupt load change 1410.

Assuming that the power source does not have a fast acting excitation system, the voltage at the power source would increase from an initial voltage value 1420 to a higher voltage value 1422 just after the initial time. However, since the abrupt load change is initially accommodated by the auxiliary DC power storage device 234, the magnitude of the voltage value 1422 is less that the above-described high voltage value 1214 (FIG. 12). As the external power source responds to the inverse ramped decrease in power supplied to the load, voltage at the power source would gradually decrease, as illustrated by the graph portion 1424. At the ending time, the voltage will settle out to a final voltage value 1426. The initial voltage value 1420 and the final voltage value 1426 are typically substantially similar in magnitude.

In some embodiments, the auxiliary DC power storage device 234 accommodates the abrupt load change for a predefined period of time before the above-described change in power begins to occur. That is, the output of the auxiliary DC power storage device 234 may be constant, or relatively constant, for a brief period of time before the ramp change in power is initiated. For example, if the external power source is a fuel cell system or the like which responds typically a few second after changes in fuel supply, the output of the auxiliary DC power storage device 234 may be constant until such time that the fuel cell or the like is able to respond to load changes.

As noted above, the energy storage capacity of the auxiliary DC power storage device 234 is typically limited in the various embodiments. Preferably, the period of time between the above-described initial times and ending times is sufficient to accommodate power transfers for eight to twelve seconds, which corresponds to a typical dynamic period of time associated with the response of power systems to dynamic type disturbances. In other embodiments, the time period may be less such that the system is responsive to transient type disturbances. In yet other embodiments, the period of time that the auxiliary DC power storage device 234 responds to the abrupt load change may last for up to one or more minutes.

The above-described examples illustrated in FIGS. 13 and 14 were simplistic examples in that only one external power source coupled to an IPC module 102 was assumed. As noted above, it is reasonable to expect that a plurality of external power sources would be serving loads of a relatively weak AC power system 218 via one or more embodiments of a micro grid controller 100. Accordingly, for a given abrupt load increase 1310 (FIG. 13) or abrupt load decrease 1410 (FIG. 14), magnitude of the power output increase 1312 or power output decrease 1412 shared between the external power source and the auxiliary DC power system 204 would be a portion of the abrupt load change 1310, 1410.

As noted above, a variety of control strategies may be devised and incorporated into logic 212 (FIG. 2). The power output increases or decreases apportioned to each external power source and their corresponding auxiliary DC power system 204 could be based upon the relative size of each power source, the type of external power source, and/or the external power source's ability to respond to abrupt load changes. Apportionment could be based on other factors or a combination of factors.

Once the power apportionment among a plurality of external power sources is determined, then the corresponding power output or power storage changes accommodated at the initial time by the respective auxiliary DC power systems 204 can be determined. For convenience, the power ramp (increase or decrease) of the auxiliary DC power system 204 and the inverse power ramp of the external power source were illustrated and described as a linear function. In alternative embodiments, any suitable ramping function may be employed, such as, but not limited to, curvilinear ramp rates, logarithmic ramp rates or exponential ramp rates. The above-described positive or negative power ramps of the auxiliary DC power storage device 234 and the inverse power ramp of the external power source may be interchangeably referred to as a "power change function" and an "inverse power change function" for convenience.

Furthermore, the control strategy of logic 212 may be modified in other ways. For example, one of the external power sources may be able to more quickly respond to power output changes as compared to other external power sources. One possible control strategy would have both the auxiliary DC power system 204 and the external power source share the initial power change at the initial time, wherein the amount of the power change to the external power source corresponds to an amount of power that the external power source can accommodate on an instantaneous basis. Another possible control strategy would increase the ramp rates such that the final power apportionments were completed before the ending times illustrated in FIG. 13 and/or FIG. 14. Furthermore, the ramp rates for an abrupt load increase and an abrupt load decrease may be different.

Various embodiments of the mobile micro grid 100 have a plurality of IPC modules 102. In some instances, one or more of the IPC modules 102 may not be coupled to an external power source. That is, there may be unused IPC modules 102. Unused IPC modules 102 can be operated such that a portion of an abrupt load increase or an abrupt load decrease can be temporarily accommodated by drawing power from or storing power into the auxiliary DC power system 204 of the unused IPC module 102.

Another variation of the control strategy of logic 212 is to have the controller 206 operate some IPC 102 modules to cause the inverse ramp to some external power sources, and to maintain power transfers (no inverse power ramp) from other external power sources. For example, one of the external power sources may be a photovoltaic cell that has an output corresponding to an amount of incident sunlight. Accordingly, the control strategy would maintain power transferred from the photovoltaic cell. The auxiliary DC power system 204 of the IPC module 102 coupled to the photovoltaic cell may, or may not, respond to the abrupt power change.

Other IPC modules 102 may respond differently to abrupt load changes. For example, some IPC modules 102 may respond in accordance to the processes described in FIG. 11 or 12. Other IPC modules 102 may respond in accordance to the processes described in FIG. 13 or 14. Furthermore, in applications having two or more mobile micro grids 100, the respective controllers 206 may respond differently to abrupt load changes. Also, the controllers 206 may coordinate the apportionment of the power changes.

It is appreciated that the above-described alternative control strategies may be very complex. Also, the control strategies of logic 212 may be dynamically changed as different numbers and/or types of external power sources are operated to provide power to loads of an AC power system 218, via one or more mobile micro grids 100. All such variations in control strategies of logic 212 are intended to be included within the scope of this disclosure.

The above-described sensor system 314 (FIG. 3) may be used to sense the occurrence of the abrupt load change. For example, sensor system 314 may sense a change to the initial amount of power through the secondary converter module 126, wherein the sensed change corresponds to the occurrence of the abrupt load change. Similarly, the sensor system 314 may sense a magnitude of a change to an initial amount of power through the primary converter 112, 114, a change to the initial amount of power through the power converter 222, a voltage change on the DC bus 120, and/or a change of a frequency of the AC power system 218. Accordingly, embodiments of the mobile micro grid 100 may determine the occurrence of an abrupt load change and respond accordingly.

For convenience, the abrupt load change was described as a change in load, either an increase or decrease, occurring on the AC power system 218. In other situations, a change in another power source may cause an abrupt load change. The other power source could be coupled to the mobile micro grid 100, coupled to a different mobile micro grid when a plurality of mobile micro grids are coupled to the AC power system, or may be directly coupled to the AC power system. All such variations of an abrupt load change caused by another power source are intended to be included within the scope of this disclosure.

FIGS. 15-21 are flowcharts illustrating embodiments of various processes for transferring power from power sources to an AC power system, or for balancing load changes between an AC power system and an external power source. The flow charts of FIG. 15-21 show the architecture, functionality, and operation of embodiments for implementing the logic 212 (FIG. 2). Alternative embodiments may implement the logic of the flow charts of FIG. 15-21 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in of FIG. 15-21, or may include additional functions. For example, two blocks shown in succession in of FIG. 15-21 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

Figure 15:
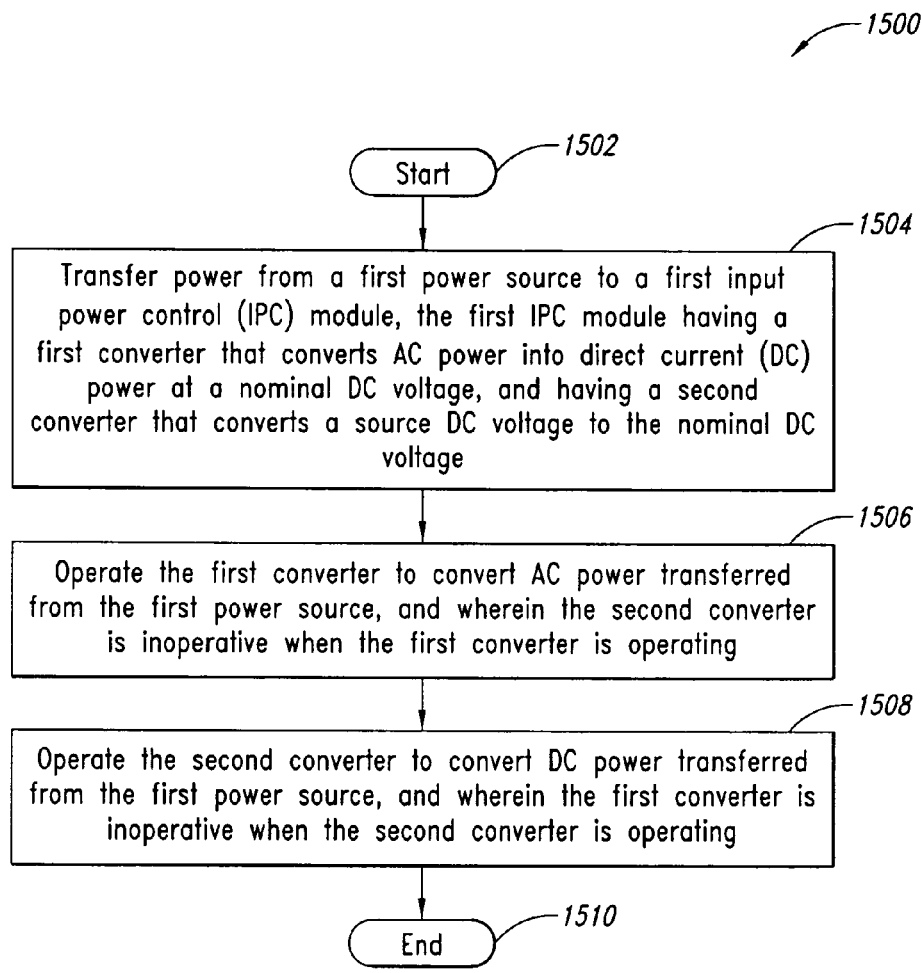
FIGS. 15-21 are flowcharts illustrating embodiments of various processes for transferring power from power sources to an AC power system, or for balancing load changes between an AC power system and an external power source.

FIG. 15 is a flowchart 1500 illustrating an embodiment of a process for converting power received from one of a plurality of different types of power sources into AC power deliverable to an AC power system 218 at a nominal AC frequency and a nominal AC voltage. The process begins at block 1502. At block 1504, power is transferred from a first power source to a first IPC module 102, the first IPC module 102 having a first converter 104 that converts AC power into DC power at a nominal DC voltage, and having a second converter 106 that converts a source DC voltage to the nominal DC voltage. At block 1506, the first converter 104 is operated to convert AC power transferred from the first power source, and wherein the second converter 106 is inoperative when the first converter is operating. At block 1508, the second converter 106 is operated to convert DC power transferred from the first power source, and wherein the first converter 104 is inoperative when the second converter is operating. The process ends at block 1510.

Figure 16:
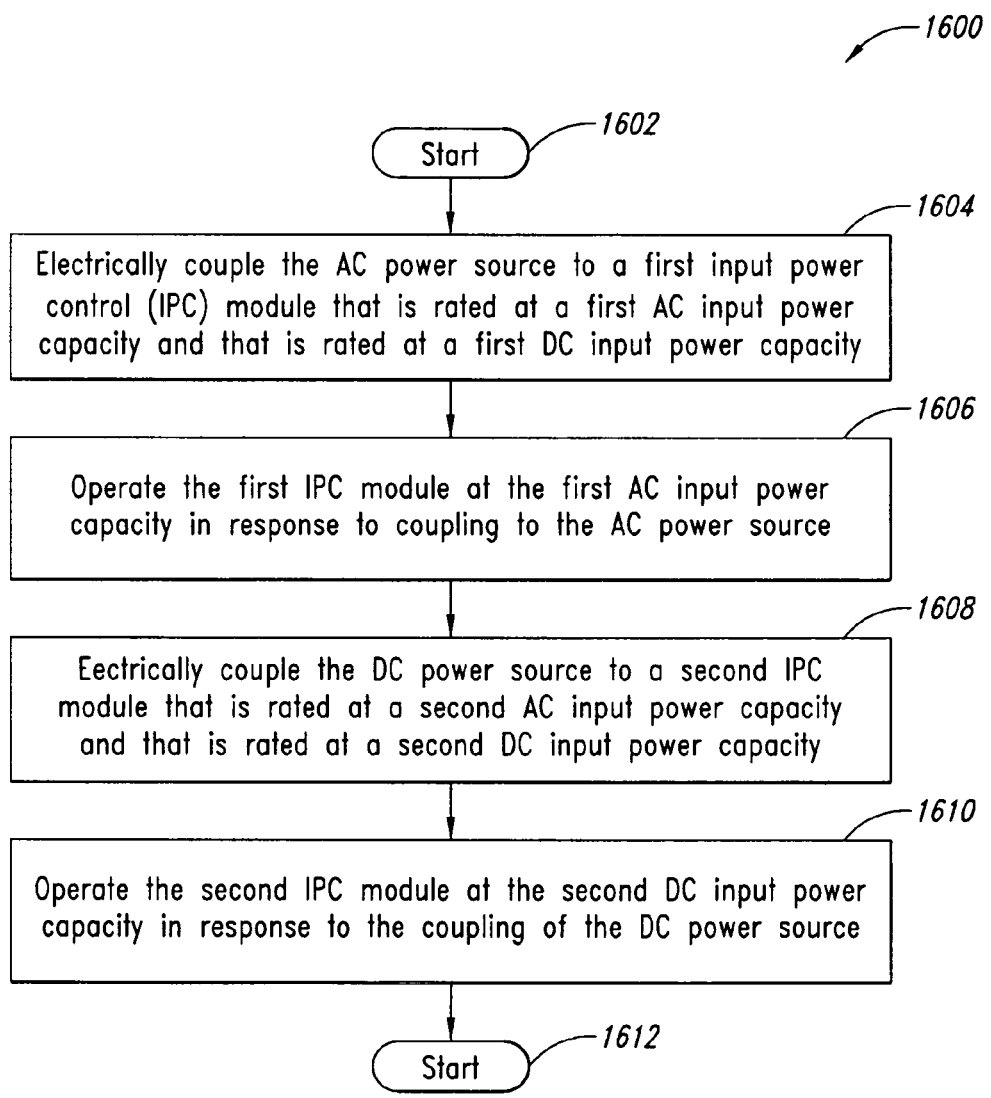

FIG. 16 is a flowchart 1600 illustrating an embodiment of a process for combining power received from at least one AC power source 108 and at least one DC power source 110. The process begins at block 1602. At block 1604, the AC power source 108 is electrically coupled to a first input power control (IPC) module 102 that is rated at a first AC input power capacity and that is rated at a first DC input power capacity. At block 1606, the first IPC module 102 is operated at the first AC input power capacity in response to coupling to the AC power source. At block 1608, the DC power source 110 is electrically coupled to a second IPC module 102 that is rated at a second AC input power capacity and that is rated at a second DC input power capacity. At block 1610, the second IPC module 102 is operated at the second DC input power capacity in response to the coupling of the DC power source 110. The process ends at block 1612.

Figure 17:
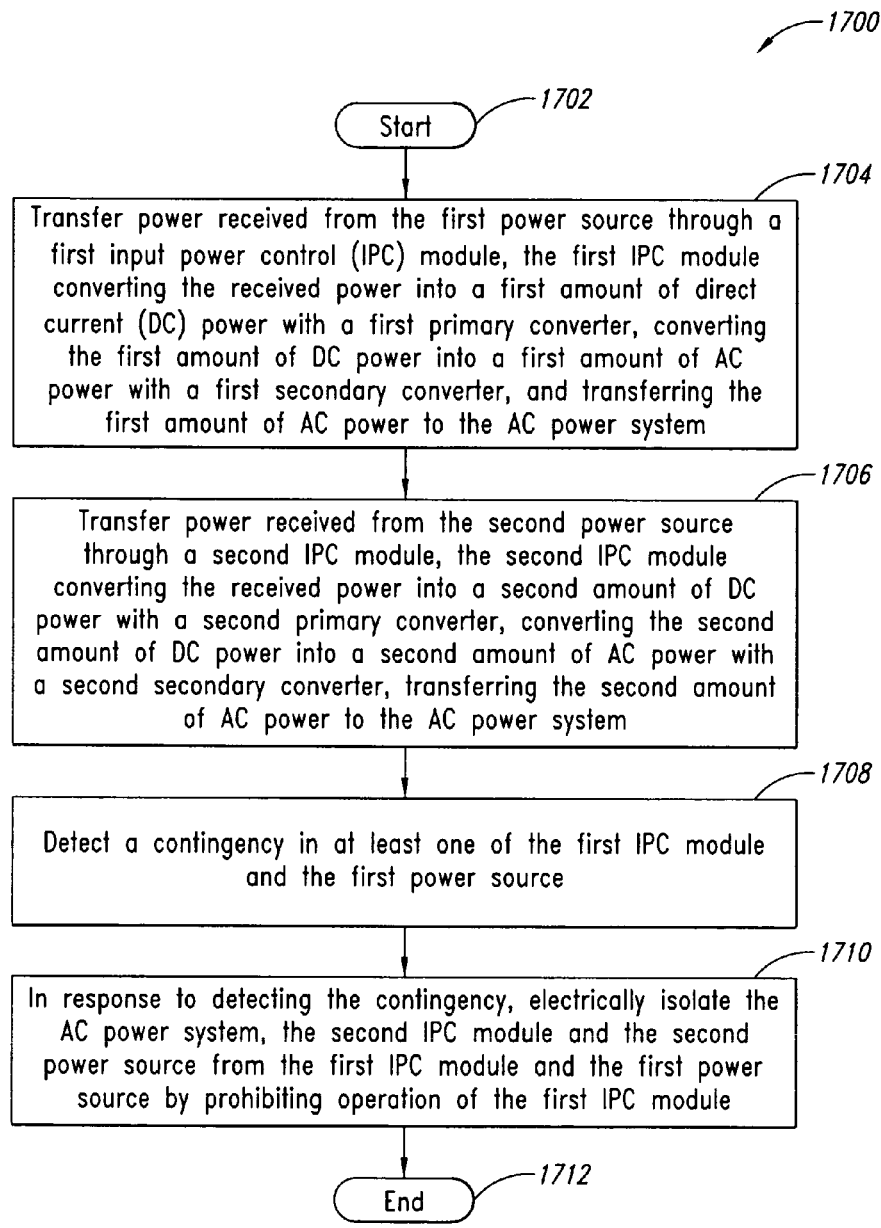

FIG. 17 is a flowchart 1700 illustrating an embodiment of a process for electrically isolating a first power source, a second power source, and an AC power system 128. The process begins at block 1702. At block 1704, power received from the first power source is transferred through a first input power control (IPC) module 102 wherein the first IPC module converts the received power into a first amount of direct current (DC) power with a first primary converter 112, 114, converts the first amount of DC power into a first amount of AC power with a first secondary converter 222, and transfers the first amount of AC power to the AC power system. At block 1706, power received from the second power source is transferred through a second IPC module 102 wherein the second IPC module 102 converts the received power into a second amount of DC power with a second primary converter 112, 114, converts the second amount of DC power into a second amount of AC power with a second secondary converter 222, and transfers the second amount of AC power to the AC power system 218. At block 1708, a contingency is detected in at least one of the first IPC module 102 and the first power source. At block 1710, in response to detecting the contingency, the AC power system 218, the second IPC module 102 and the second power source are electrically isolated from the first IPC module and the first power source by prohibiting operation of the first IPC module 102. The process ends at block 1712.

Figure 18:
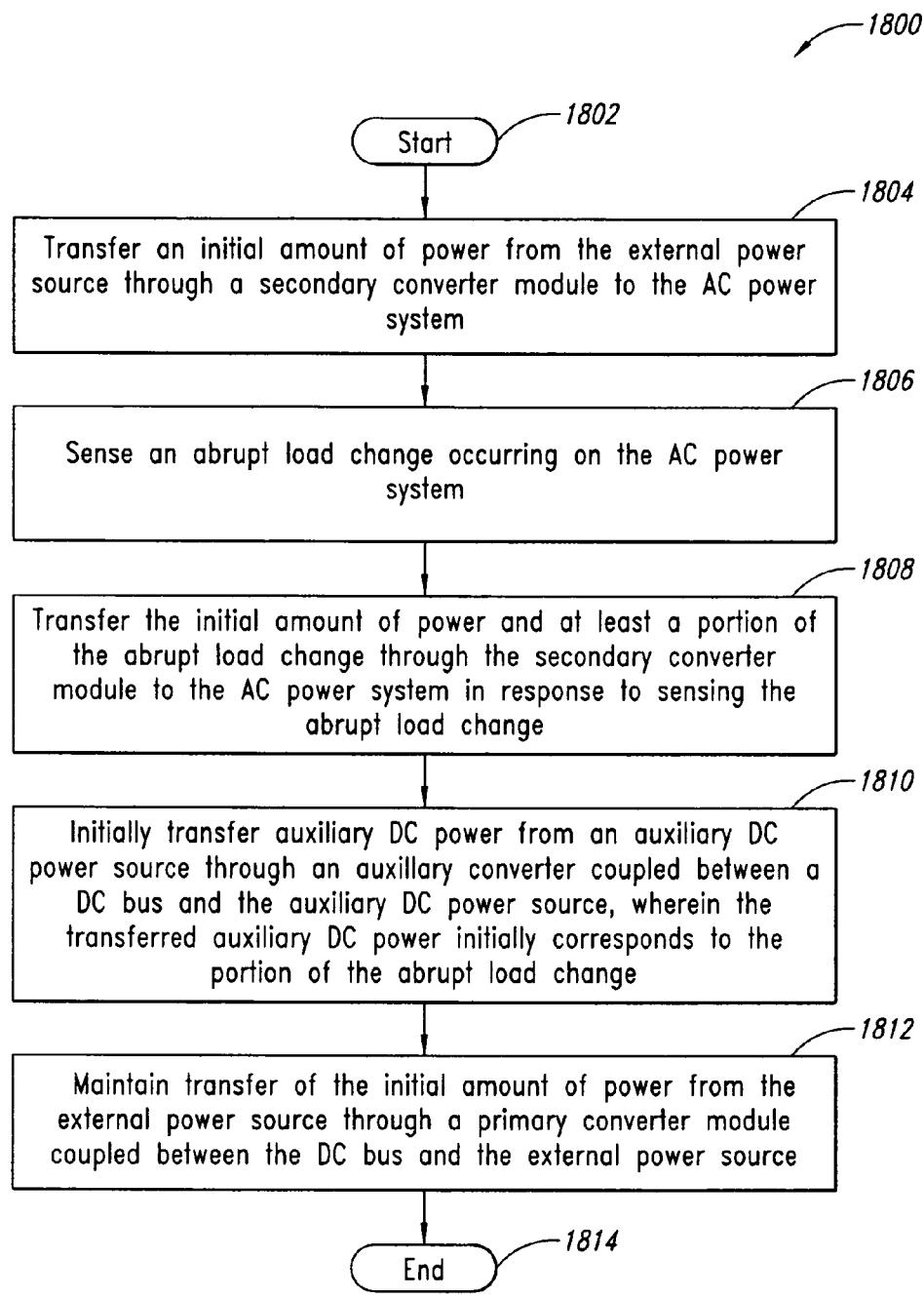

FIG. 18 is a flowchart 1800 illustrating an embodiment of a process for a method for balancing load changes between an AC power system 218 and an external power source. The process begins at block 1802. At block 1804, an initial amount of power is transferred from the external power source through a secondary converter module to the AC power system 218. At block 1806, an abrupt load change occurring on the AC power system 218 is sensed. At block 1808, the initial amount of power and at least a portion of the abrupt load change is transferred through the secondary converter module to the AC power system 218 in response to sensing the abrupt load change. At block 1810, auxiliary DC power from an auxiliary DC power storage device 234 is initially transferred through an auxiliary converter coupled between a DC bus 120 and the auxiliary DC power storage device 234, wherein the transferred auxiliary DC power initially corresponds to the portion of the abrupt load change. At block 1812, transfer of the initial amount of power from the external power source through a primary converter module coupled between the DC bus 120 and the external power source is maintained. The process ends at block 1814.

Figure 19:
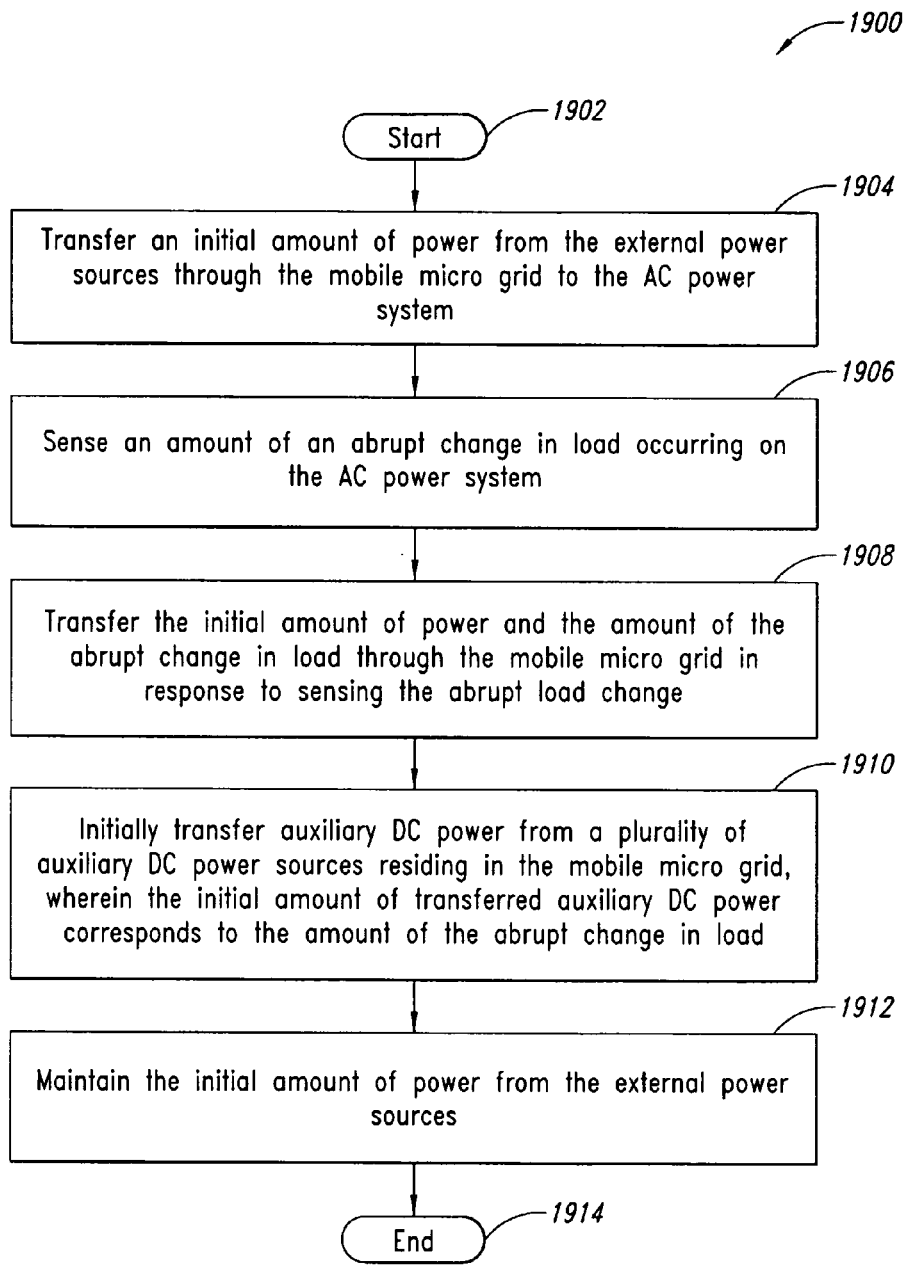

FIG. 19 is a flowchart 1900 illustrating an embodiment of a process for balancing load changes between an AC power system 218 and a plurality of external power sources, wherein the external power sources are electrically coupled to a mobile micro grid 100, and wherein the mobile micro grid 100 is electrically coupled to the AC power system 218. The process begins at block 1902. At block 1904, an initial amount of power is transferred from the external power sources through the mobile micro grid 100 to the AC power system 218. At block 1906, an amount of an abrupt change in load occurring on the AC power system 218 is sensed. At block 1908, the initial amount of power and the amount of the abrupt change in load is transferred through the mobile micro grid 100 in response to sensing the abrupt load change. At block 1910, auxiliary DC power from a plurality of auxiliary DC power sources 234 residing in the mobile micro grid 100 is initially transferred, wherein the initial amount of transferred auxiliary DC power corresponds to the amount of the abrupt change in load. At block 1912, the initial amount of power from the external power sources is maintained. The process ends at block 1914.

Figure 20:
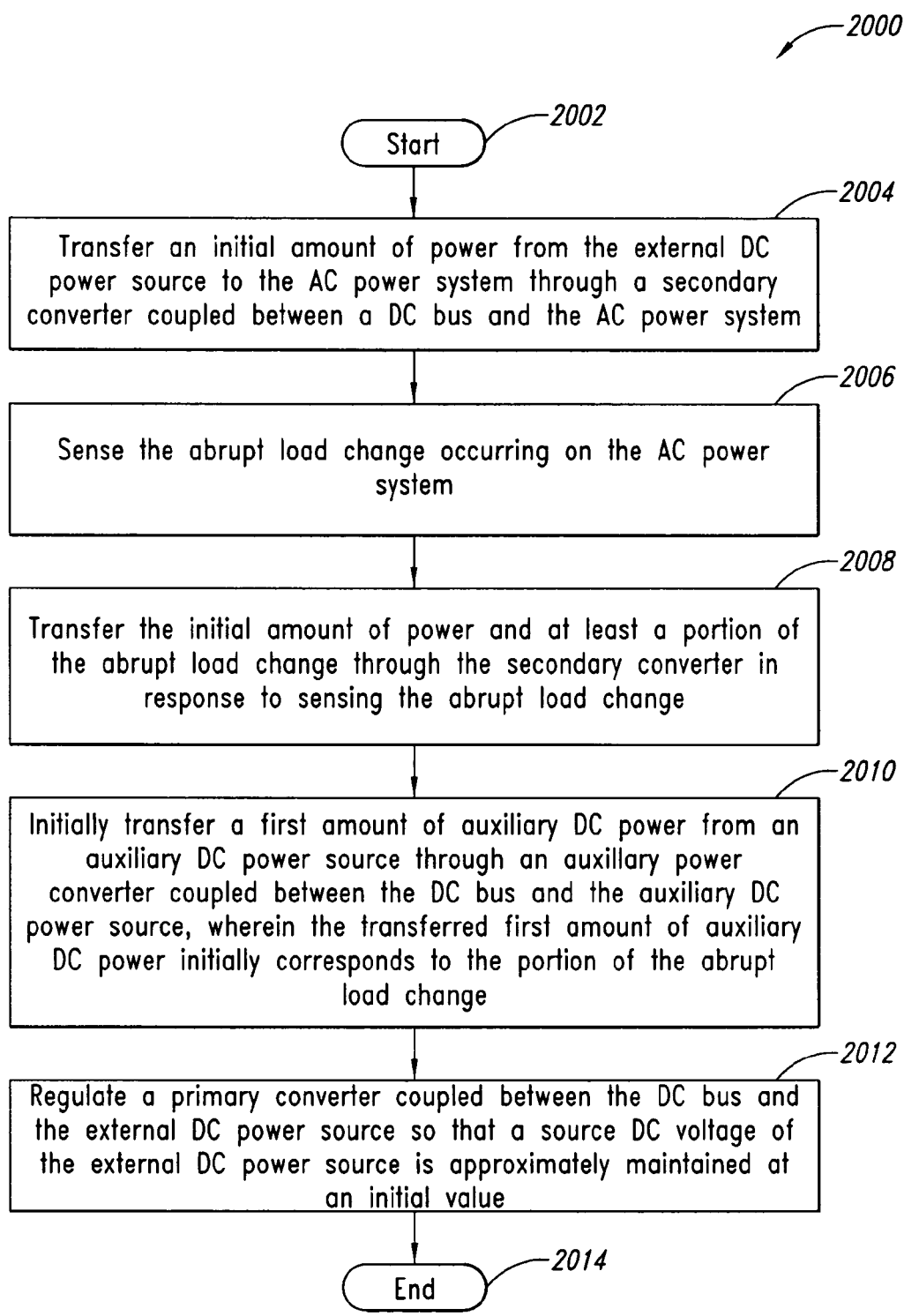

FIG. 20 is a flowchart 2000 illustrating an embodiment of a process for maintaining voltage of an external DC power source 110 following an abrupt load change occurring on an AC power system 218. The process begins at block 2002. At block 2004, an initial amount of power is transferred from the external DC power source 110 to the AC power system 218 through a secondary converter 222 coupled between a DC bus 120 and the AC power system 218. At block 2006, the abrupt load change occurring on the AC power system 218 is sensed. At block 2008, the initial amount of power and at least a portion of the abrupt load change is transferred through the secondary converter 222 in response to sensing the abrupt load change. At block 2010, a first amount of auxiliary DC power is transferred from an auxiliary DC power storage device 234 through an auxiliary power converter 232 coupled between the DC bus 120 and the auxiliary DC power storage device 234, wherein the transferred first amount of auxiliary DC power initially corresponds to the portion of the abrupt load change. At block 2012, a primary converter coupled between the DC bus 120 and the external DC power source 110 is regulated so that a source DC voltage of the external DC power source 110 is approximately maintained at an initial value. The process ends at block 2014.

Figure 21:
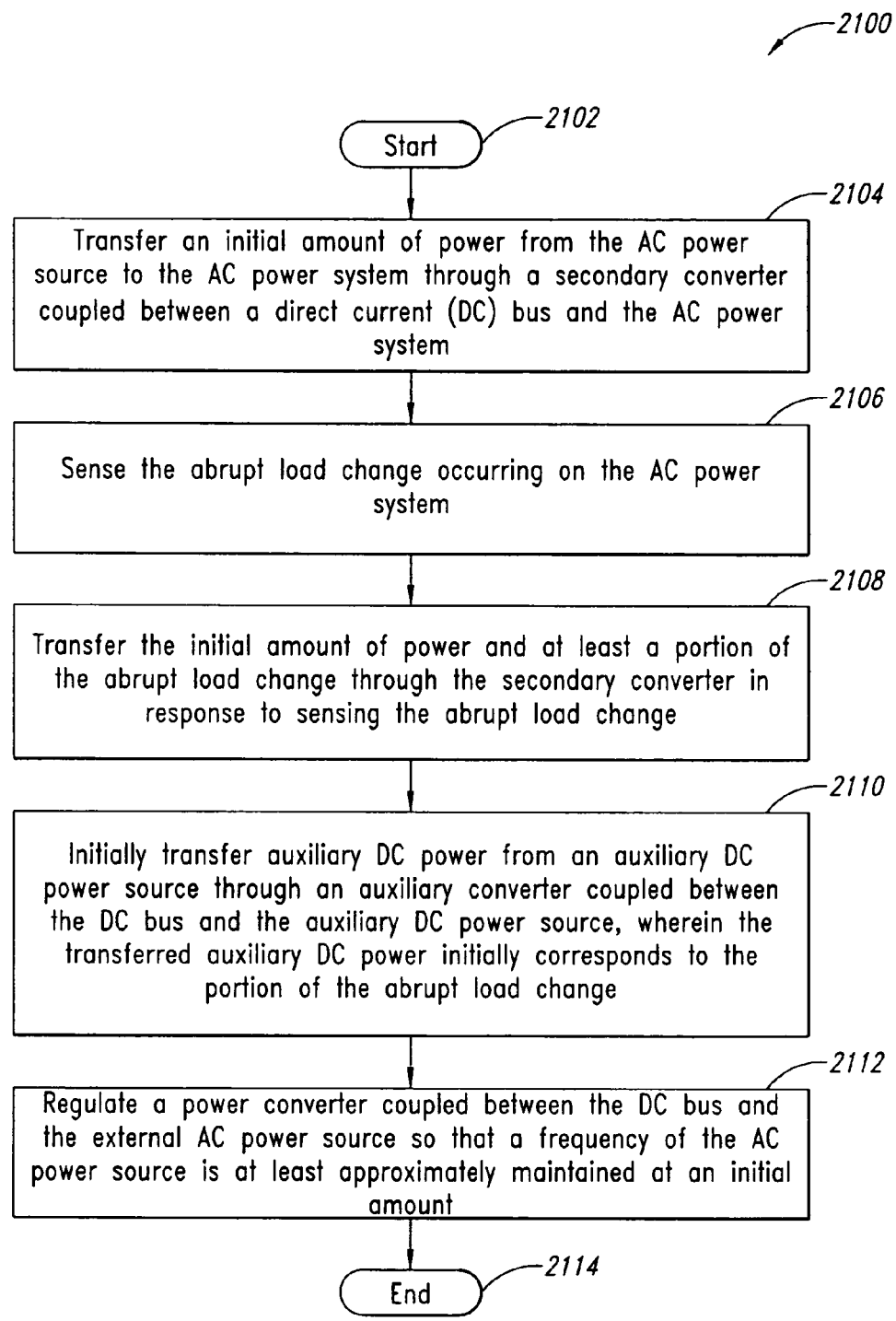

FIG. 21 is a flowchart 2100 illustrating an embodiment of a process for method for maintaining frequency of an AC power source 108 following an abrupt load change occurring on an AC power system 218. The process begins at block 2102. At block 2104, an initial amount of power is transferred from the AC power source 108 to the AC power system 218 through a secondary converter 222 coupled between a DC bus 120 and the AC power system 218. At block 2106, the abrupt load change occurring on the AC power system 218 is sensed. At block 2108, the initial amount of power and at least a portion of the abrupt load change is transferred through the secondary converter 222 in response to sensing the abrupt load change. At block 2110, auxiliary DC power from an auxiliary DC power storage device 234 is initially transferred through an auxiliary converter 222 coupled between the DC bus 120 and the auxiliary DC power storage device 234, wherein the transferred auxiliary DC power initially corresponds to the portion of the abrupt load change. At block 2112, a power converter coupled between the DC bus 120 and the external AC power source 108 is regulated so that a frequency of the AC power source is at least approximately maintained at an initial amount. The process ends at block 2114.

In the above described embodiments of the mobile micro grid 100-100*h* (FIGS. 1-10), a secondary converter module 126 resided in each of the IPC modules 102. In an alternative embodiment, the secondary converter module 126 is external to the IPC modules 102. The external secondary converter module 126 is coupled to a plurality of IPC modules 102. In such an embodiment, the total number of secondary converter modules 126 of a mobile micro gird 100 may be reduced since a single secondary converter module 126 transfers power received from a plurality of IPC modules 102. For example, in embodiments having four IPC modules 102, the number of secondary converter modules 126 could be reduced to one or two. Accordingly, the DC bus 120 of each IPC converter would be coupled to the DC input of the secondary converter modules 126, such as through another DC bus or direct connections. It is appreciated that the possible variations of external secondary converter module 126 are too numerous to be described herein. All such embodiments are intended to be included within the scope of this disclosure.

In the above-described various embodiments, the processor system 208 (FIG. 2) may employ a microprocessor, a digital signal processor (DSP), an application specific integrated circuit (ASIC) and/or a drive board or circuitry, along with any associated memory, such as random access memory (RAM), read only memory (ROM), electrically erasable read only memory (EEPROM), or other memory device storing instructions to control operation. The processor system 208 may be housed with the other components of the mobile micro grid 100.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other power conversion systems, not necessarily the exemplary DC/DC and/or AC/DC power converter embodiments generally described above. For example, the power conversion system may comprise additional DC/DC power converters or AC/DC power converters with different topologies, as may be suited to the particular application. Additionally or alternatively, some embodiments may be implemented with three-phase interleaved DC/DC power converter topologies. Some embodiments can include four or more phase legs, two-phase interleaved power converter topologies, or three or more phase legs.

As used herein and in the claims, the term "power semiconductor device" includes semiconductor devices designed to handle large currents, large voltages and/or large amounts of power with respect to standard semiconductor devices, including power semiconductor switch devices, power semiconductor diodes and other such devices used in power distribution, for example, grid or transportation related applications. As discussed above, some of the power semiconductor devices may, for example, take the form of MOSFETs, while others of the semiconductor devices may take the form of IGBTs. As noted above, the use of MOSFETS permits power converters to operate at higher switching frequencies than would otherwise be possible with IGBTs. However, in some embodiments the semiconductor devices may take the form IGBTs or other suitably rated switching devices, particular where the desired operating frequency of the power converters is sufficiently low. Further, in some embodiments the semiconductor devices of the power converters may take the form of MOSFETS, particularly where cost factors permit such.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the above U.S. patents, patent applications and publications referred to in this specification, including but not limited to: copending U.S. patent application Ser. No. 11/440,219, filed May 23, 2006, entitled "SYSTEM AND METHOD FOR A POWER SYSTEM MICRO GRID" (Express Mail No. EV335548348US); U.S. patent application Ser. No. 11/440,216, filed May 23, 2006, entitled "SYSTEM AND METHOD FOR RESPONDING TO ABRUPT LOAD CHANGES ON A POWER SYSTEM" (Express Mail No. EV335548351US); U.S. patent application Ser. No. 11/440,229, filed May 23, 2006, entitled "SYSTEM AND METHOD FOR CONTROLLING POWER FLOW IN A POWER SYSTEM" (Express Mail No. EV741780469US); and U.S. patent application Ser. No. 11/440212, filed May 23, 2006, entitled "SYSTEM AND METHOD FOR CONNECTING POWER SOURCES TO A POWER SYSTEM" (Express Mail No. EV741780472US); are incorporated herein by reference, in their entirety, as are the sections which follow this description. Aspects of the invention can be modified, if necessary, to employ systems, circuits and concepts of the various patents, applications and publications to provide yet further embodiments of the invention.

These and other changes can be made to the present systems and methods in light of the above-detailed description. In general, in the following claims, the terms used should not be construed to limit the invention to the specific embodiments disclosed in the specification and the claims, but should be construed to include all power systems and methods that read in accordance with the claims. Accordingly, the invention is not limited by the disclosure, but instead its scope is to be determined entirely by the following claims.

The invention claimed is:

1. An input power control (IPC) module for transferring power from a plurality of power sources to an alternating current (AC) system, comprising:
a direct current (DC) bus operable at a DC bus voltage;
a non-isolated first primary converter module electrically coupled to the DC bus and operable to receive a first amount of power from a first power source, and operable to convert the received power from the first power source into a first amount of DC power at the DC bus voltage, wherein the first primary converter module comprises a first alternating current to direct current (AC/DC) converter and a first direct current to direct current (DC/DC) converter with only one of the first AC/AC converter and the first DC/DC converter coupled to the first power source; and
an isolated second primary converter module electrically coupled to the DC bus and operable to receive a second amount of power from a second power source, and operable to convert the received power from the second power source into a second amount of DC power at the DC bus voltage, wherein the second primary converter module comprises second AC/DC converter and a second DC/DC converter with only one of the second AC/AC converter and the DC/DC converted coupled to the second power source,
wherein the second power source is electrically isolated from the DC bus by the isolated second primary converter module.

2. The IPC module of claim 1 wherein the first power source is not electrically isolated from the DC bus, wherein the first power source is electrically isolated from the AC system, and wherein the first power source is electrically isolated from the second power source.

3. The IPC module of claim 1, further comprising:
an isolation means electrically coupled between the isolated second primary converter module and the DC bus.

4. The IPC module of claim 1, further comprising:
an isolation means electrically coupled between the second power source and the isolated second primary converter module.

5. The IPC module of claim 1 wherein the isolated second primary converter module comprises:
a diode rectifier operable to convert the second amount of power into the second amount of DC power at a second DC voltage; and
an isolated DC/DC converter electrically coupled between the diode rectifier and the DC bus, operable to convert the second amount of power at the second DC voltage to the DC bus voltage, wherein the second power source is electrically isolated from the DC bus by the isolated DC/DC converter.

6. The IPC module of claim 5, further comprising:
a third primary converter module electrically coupled to the isolated DC/DC converter,
wherein the third primary converter module is operable to receive DC power from a DC power source at a third DC voltage, wherein the isolated DC/DC converter converts the received DC power into a third amount of DC power at the DC bus voltage, and wherein the DC power source is electrically isolated from the DC bus by the isolated DC/DC converter.

7. The IPC module of claim 6 where in response to the third primary converter module receiving power from the DC power source, the isolated second primary converter module is inoperable to receive the second amount of power.

8. The IPC module of claim 6 where in response to the isolated second primary converter module receiving power from the second power source, the third primary converter module is inoperable.

9. The IPC module of claim 1 wherein the isolated second primary converter module is an isolated AC/DC converter.

10. The IPC module of claim 1 wherein the isolated secondary primary converter is an isolated DC/DC converter.

11. The IPC module of claim 1, further comprising:
an isolated secondary converter module coupled to the DC bus, operable to receive the first amount of DC power and the second amount of DC power from the DC bus, operable to convert the received first amount and the received second amount of DC power to a first amount of AC power, and operable to transfer the first amount of AC power to the AC system,
wherein the isolated secondary converter module electrically isolates the AC system from the DC bus.

12. The IPC module of claim 11 wherein the isolated secondary converter module is an isolated DC/AC converter.

13. The IPC module of claim 11 wherein the isolated secondary converter module comprises:
a secondary isolation means that electrically isolates the AC system from the DC bus.

14. The IPC module of claim 13, wherein the secondary isolation means comprises:
an isolation transformer coupled between the AC system and the isolated secondary converter module, wherein the isolation transformer is operable to convert a first AC voltage provided from the isolated secondary converter module into a nominal AC voltage used by the AC system.

15. The IPC module of claim 1, further comprising:
an isolated third primary converter module coupled to the DC bus and operable to receive power from a third power source, and operable to convert the received power from the third power source into a third amount of DC power at the DC bus voltage, wherein the third power source is electrically isolated from the DC bus by the isolated third primary converter module.

16. The IPC module of claim 15 wherein the isolated third primary converter module comprises:
an isolated DC/DC converter electrically coupled to the third power source, and wherein the isolated DC/DC converter is operable to receive DC power from the third power source at a DC voltage, wherein the isolated DC/DC converter converts the received DC power into the third amount of DC power at the DC bus voltage, and wherein the third power source is electrically isolated from the DC bus by the isolated DC/DC converter.

17. The IPC module of claim 15 wherein the isolated third primary converter module comprises:
a diode rectifier operable to convert the third amount of power into the third amount of DC power at a DC voltage; and
an isolated DC/DC converter electrically coupled between the diode rectifier and the DC bus, operable to convert the third amount of DC power at the DC voltage to the DC bus voltage, wherein the third power source is electrically isolated from the DC bus by the isolated DC/DC converter.

18. A method of transferring power from a plurality of power sources to an alternating current (AC) power system through an input power control (IPC) module, comprising:
converting a first amount of power, received from a first power source through a first primary converter module coupled to a direct current (DC) bus, into a first amount of DC power, wherein the first primary converter module comprises a first alternating current to direct current (AC/DC) converter and a first direct current to direct current (DC/DC) converter with only one of the first AC/AC converter and the first DC/DC converter coupled to the first power source;
converting a second amount of power, received from a second power source through a second primary converter module coupled to the DC bus, into a second amount of DC power, wherein the second primary converter module comprises second AC/DC converter and a second DC/DC converter with only one of the second AC/AC converter and the DC/DC converted coupled to the second power source;
converting the first and the second amounts of DC power into AC power;
transferring the AC power to the AC power system through a secondary converter module coupled to the DC bus;
electrically isolating the second primary converter module from the DC bus; and
electrically isolating the secondary converter module from the DC bus.

19. The method of claim 18, wherein the first power source and the second power source are external to the IPC module.

20. An isolation system for electrically isolating a ground of a first power source, a ground of a second power source and a ground of an alternating current (AC) power system, comprising:
a first input power control (IPC) module, comprising:
a first primary converter that converts power received from the first power source into direct current (DC) power, wherein the first primary converter includes a first alternating current to direct current (AC/DC) converter and a first direct current to direct current (DC/DC) converter, with only one of the first AC/DC converter and the first DC/DC converter coupled to the first power source at any one time;
a first ground connection electrically coupled to a ground connection from the first power source, and that commonly grounds the first power source and the first IPC module; and
a first secondary converter electrically coupled to the first primary converter that converts the DC power received from the first primary converter into a first amount of AC power, and that transfers the first amount of AC power to the AC power system; and
a second IPC module, comprising:
a second primary converter that converts power received from the second power source into DC power, wherein the second primary converter includes a second AC/DC converter and a second DC/DC converter with only one of the second AC/DC and the second DC/Dc converter coupled to the second power source at any one time;
a second ground connection electrically coupled to a ground connection from the second power source, and that commonly grounds the second power source and the second IPC module; and
a second secondary converter electrically coupled to the second primary converter and that converts the DC power received from the second primary converter into a second amount of AC power, and that transfers the second amount of AC power to the AC power system, wherein the ground connections of the commonly grounded first power source and first IPC module are electrically isolated from the ground connections of the commonly grounded second power source and second IPC module.

21. The isolation system of claim 20 wherein the first primary converter and the first secondary converter electrically isolate the first ground connection from the second IPC module, and wherein the second primary converter and the second secondary converter electrically isolate the second ground connection from the first IPC module.

22. The isolation system of claim 20 wherein the first primary converter and the first secondary converter electrically isolate the first ground connection from the AC power system.

23. The isolation system of claim 20 wherein the second primary converter and the second secondary converter electrically isolate the second ground connection from the AC power system.

24. The isolation system of claim 20 wherein the first power source is an AC power source and the ground connection from the AC power source is a ground potential voltage connection.

25. The isolation system of claim 20 wherein the first power source is an AC power source and the ground connection from the AC power source is a neutral potential voltage connection.

26. The isolation system of claim 20 wherein the first power source is a DC power source and the ground connection from the DC power source is a negative DC voltage connection.

* * * * *